US009826515B2

(12) United States Patent
Freda et al.

(10) Patent No.: US 9,826,515 B2
(45) Date of Patent: Nov. 21, 2017

(54) METHODS, SYSTEMS AND APPARATUS FOR DEFINING AND USING PHICH RESOURCES FOR CARRIER AGGREGATION

(75) Inventors: Martino Freda, Laval (CA); Mihaela C. Beluri, Jericho, NY (US); Jean-Louis Gauvreau, La Prairie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 78 days.

(21) Appl. No.: 14/125,903

(22) PCT Filed: Jun. 14, 2012

(86) PCT No.: PCT/US2012/042412
§ 371 (c)(1),
(2), (4) Date: Feb. 19, 2014

(87) PCT Pub. No.: WO2012/174213
PCT Pub. Date: Dec. 20, 2012

(65) Prior Publication Data
US 2014/0204854 A1    Jul. 24, 2014

Related U.S. Application Data

(60) Provisional application No. 61/496,911, filed on Jun. 14, 2011.

(51) Int. Cl.
*H04W 4/00*     (2009.01)
*H04W 72/04*    (2009.01)
(Continued)

(52) U.S. Cl.
CPC .............. *H04W 72/042* (2013.01); *H04L 1/18* (2013.01); *H04L 5/0055* (2013.01); *H04L 5/0092* (2013.01)

(58) Field of Classification Search
CPC ........................................................ H04L 1/18
See application file for complete search history.

(56) References Cited

U.S. PATENT DOCUMENTS

| 2011/0128931 A1* | 6/2011 | Ishii ...................... H04L 1/1854 370/329 |
| 2011/0268048 A1* | 11/2011 | Toskala .................... H04L 1/16 370/329 |

(Continued)

FOREIGN PATENT DOCUMENTS

| KR | WO 2011004989 A2 * | 1/2011 | .......... H04L 1/1861 |
| KR | WO 2011049368 A2 * | 4/2011 | .......... H04L 1/1861 |
| WO | WO 2010120159 A2 * | 10/2010 | .......... H04L 1/1854 |

OTHER PUBLICATIONS

Machine Translation of WO 2011/049368 A2.*

(Continued)

*Primary Examiner* — Huy D Vu
*Assistant Examiner* — Kevin Cunningham
(74) *Attorney, Agent, or Firm* — Condo Roccia Koptiw LLP

(57) ABSTRACT

Systems, methods, and instrumentalities are disclosed to provide feedback to a user equipment (UE). A UE may transmit uplink data via a supplementary cell. A network device, such as a HeNB, eNB, etc., may receive the uplink data from the UE via the supplementary cell. The network device may send feedback associated with the uplink data to the UE via a physical downlink shared channel (PDSCH) when downlink data is available for transmission to the UE. The feedback may be physical hybrid ARQ indicator channel (PHICH) ACK/NACK information. The feedback sent via the PDSCH may be multiplexed with the downlink data. The network device may send the feedback associated with (Continued)

the uplink data to the UE via a physical downlink control channel (PDCCH) when downlink data is not available for transmission to the UE.

12 Claims, 24 Drawing Sheets

(51) Int. Cl.
*H04L 1/18* (2006.01)
*H04L 5/00* (2006.01)

(56) References Cited

U.S. PATENT DOCUMENTS

| | | | | |
|---|---|---|---|---|
| 2012/0026935 | A1* | 2/2012 | Park | H04L 1/1854 370/315 |
| 2012/0113942 | A1* | 5/2012 | Kim | H04L 1/1861 370/329 |
| 2012/0113945 | A1* | 5/2012 | Moon | H04L 1/1861 370/329 |
| 2012/0250631 | A1* | 10/2012 | Hakola | H04L 5/001 370/329 |
| 2013/0265961 | A1* | 10/2013 | Van Phan | H04W 4/00 370/329 |

OTHER PUBLICATIONS

Machine Translation of WO 2011/004989 A2.*
Machine Translation of WO 2010/120159.*
3rd Generation Partnership Project (3GPP), R1-100491, "Comparison of Carrier Segment and Extension Carrier for Contiguous Carrier Aggregation", NTT DoCoMo, 3GPP TSG RAN WG1 Meeting #59bis, Valencia, Spain, Jan. 18-22, 2010, 5 pages.
3rd Generation Partnership Project (3GPP), R1-105862, "UCI on PUSCH", Ericsson, ST-Ericsson, 3GPP TSG RAN WG1 Meeting #63, Jacksonville, USA, Nov. 15-19, 2010, 4 pages.
3rd Generation Partnership Project (3GPP), R1-106395, "Remaining Issues on Selection of PUSCH for UCI Transmission", Alcatel-Lucent, Alcatel-Lucent Shanghai Bell, 3GPP TSG-RAN WG1 #63, Jacksonville, USA, Nov. 15-19, 2010, 3 pages.
European Telecommunications Standards Institute (ETSI), TR 102 907 v0.0.9, "Reconfigurable Radio Systems (RRS); Use Cases for Operation in White Space Frequency Bands", Jan. 2011, 54 pages.
3rd Generation Partnership Project (3GPP), TS 36.101 V10.1.1, "Technical Specification Group Radio Access Network, Evolved Universal Terrestrial Radio Access (E-UTRA), User Equipment (UE) Radio Transmission and Reception (Release 10)", Jan. 2011, 30 pages.
3rd Generation Partnership Project (3GPP), TS 36.331 V10.1.0, "Technical Specification Group Radio Access Network, Evolved Universal Terrestrial Radio Access (E-UTRA), User Equipment (UE) Radio Transmission and Reception (Release 10)", Mar. 2011, 154 pages.
Erik Dahlman et. al., "3G Evolution: HSPA and LTE for Mobile Broadband", 2007, 485 pages.
3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, 51 pages.
3rd Generation Partnership Project (3GPP), R1-100841, "On PHICH for carrier aggregation", Ericsson, ST-Ericsson, 3GPP TSG RAN WG1 Meeting #60, San Francisco, USA, Feb. 22-26, 2010, 2 pages.
3rd Generation Partnership Project (3GPP), R1-102641, "PHICH collision in LTE-A", CATT, 3GPP TSG RAN WG1 Meeting #61, Montreal, Canada, May 10-14, 2010, 2 pages.
3rd Generation Partnership Project (3GPP), R1-102812, "PHICH collision handling for carrier aggregation", Intel Corporation (UK) Ltd, 3GPP TSG RAN WG1 Meeting #61, Montreal, Canada, May 10-14, 2010, 4 pages.
3rd Generation Partnership Project (3GPP), R1-102606, "On PHICH for carrier aggregation", Ericsson, ST-Ericsson, 3GPP TSG RAN WG1 Meeting #61, Montreal, Canada, May 10-14, 2010, 2 pages.
3rd Generation Partnership Project (3GPP), R1-080247, "Performance Evaluation on PHICH in E-UTRA", NTT DoCoMo, 3GPP TSG RAN WG1 Meeting #51, Sevilla, Spain, Jan. 14-18, 2008, 5 pages.
3rd Generation Partnership Project (3GPP), R1-094080, "PHICH Mapping in Asymmetric Carrier Aggregation", Samsung, 3GPP TSG RAN WG1 Meeting #58, Miyazaki, Japan, Oct. 12-16, 2009, 3 pages.

* cited by examiner

METHODS, SYSTEMS AND APPARATUS FOR DEFINING AND USING PHICH RESOURCES FOR CARRIER AGGREGATION

CROSS-REFERENCE TO RELATED APPLICATIONS

This application is the 35 U.S.C. §371 National Stage of Patent Cooperation Treaty Application No. PCT/US2012/042412, filed Jun. 14, 2012, which claims the benefit of U.S. Provisional Patent Application No. 61/496,911, filed on Jun. 14, 2011, the contents of which are hereby incorporated by reference herein.

BACKGROUND

The analog TV bands included the Very High Frequency (VHF) band and the Ultra High Frequency (UHF) band. VHF is composed of the low VHF band operating from 54 MHz to 88 MHz (excluding 72 MHz to 76 MHz), and the high VHF band operating from 174 MHz to 216 MHz. The UHF band is composed of the low UHF band operating from 470 MHz to 698 MHz, and the high UHF band operating from 698 MHz to 806 MHz In the United States, the Federal Communications Commission (FCC) set Jun. 12, 2009 as the deadline for replacing analog TV broadcasting by digital TV broadcasting. The digital TV channel definitions may be the same as the analog TV channel. The digital TV bands may use analog TV channels 2 to 51 and may not use 37, while the analog TV channels 52 to 69 may be used for new non-broadcast users. The frequency allocated to a broadcasting service but not used locally may be referred to as White Space (WS). TV White Space (TVWS) may refer to the TV channels 2 to 51, which may not include except 37.

Besides TV signals, there are other licensed signals that may be transmitted on the TV bands. Channel 37 may be reserved for radio astronomy and Wireless Medical Telemetry Service (WMTS), where the latter may operate on any vacant TV channels 7 to 46. The Private Land Mobile Radio System (PLMRS) may use channels 14 to 20 in certain metropolitan areas. Remote control devices may use channels above channel 4, except channel 37. The starting frequency of FM channel 200 is 87.9 MHz, with partial overlapping on TV channel 6. The wireless microphone may use channels 2 to 51 with a bandwidth of 200 kHz.

As a result of the transition from analog to digital TV transmissions, certain portions of the spectrum may no longer be used for TV transmissions, though the amount and exact frequency of unused spectrum may vary from location to location. The FCC has opened up these TVWS frequencies for a variety of unlicensed uses.

The opportunistic use of unlicensed bands, such as TVWS bands, may be exploited by secondary users for any radio communication given that the use does not interfere with other incumbent and/or primary users. There are many problems associated with LTE, and other cellular technologies, use of unlicensed spectrum such as TVWS.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and instrumentalities are disclosed to provide feedback to a user equipment (UE). A UE may transmit uplink data via a supplementary cell. A network device, such as a HeNB, eNB, etc., may receive the uplink data from the UE via the supplementary cell. The network device may send feedback associated with the uplink data to the UE via a physical downlink shared channel (PDSCH) when downlink data is available for transmission to the UE. The feedback may be physical hybrid ARQ indicator channel (PHICH) ACK/NACK information. The feedback sent via the PDSCH may be multiplexed with the downlink data. The network device may send the feedback associated with the uplink data to the UE via a physical downlink control channel (PDCCH) when downlink data is not available for transmission to the UE. The feedback may be sent on one or more of a primary component carrier and a secondary component carrier. The feedback may be sent on a best available licensed cell. The feedback may be sent on a supplementary cell.

The feedback sent via the PDCCH may be sent via a downlink control information (DCI) format on the PDCCH. The DCI format may be format 1C associated with the PDCCH. A modulation and encoding value associated with the DCI format may be used to indicate that the DCI format comprises ACK/NACK information. ACK/NACK information associated with the feedback may be sent in a resource block assignment. The resource block assignment may be a single resource block using a type 2 allocation.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments may now be described with reference to the figures. However, while the present invention may be described in connection with exemplary embodiments, it is not limited thereto and it is to be understood that other embodiments may be used or modifications and additions may be made to the described embodiments for performing the same function of the present invention without deviating therefrom.

The FCC may allow unlicensed radio transmitters to operate in the TVWS, which may not include channels 3, 4 and 37, e.g., as long as minimum interference is caused to the licensed radio transmissions. Unlicensed TV Band Devices (TVBDs) may be referred to as: (1) a fixed TVBD; (2) a mode I portable (e.g., personal) TVBD; and (3) a mode II portable (e.g., personal) TVBD. Fixed TVBDs and mode II portable TVBDs may have geo-location database access capability and may register to the TV band database. Access to the TV band database may query the allowed TV channels to avoid interference with digital TV signals and licensed signals transmitted on the TV bands. Spectrum sensing may be an add-on feature for TVBDs, e.g., to enable low interference to be caused to digital TV signals and licensed signals.

Figure 1A:
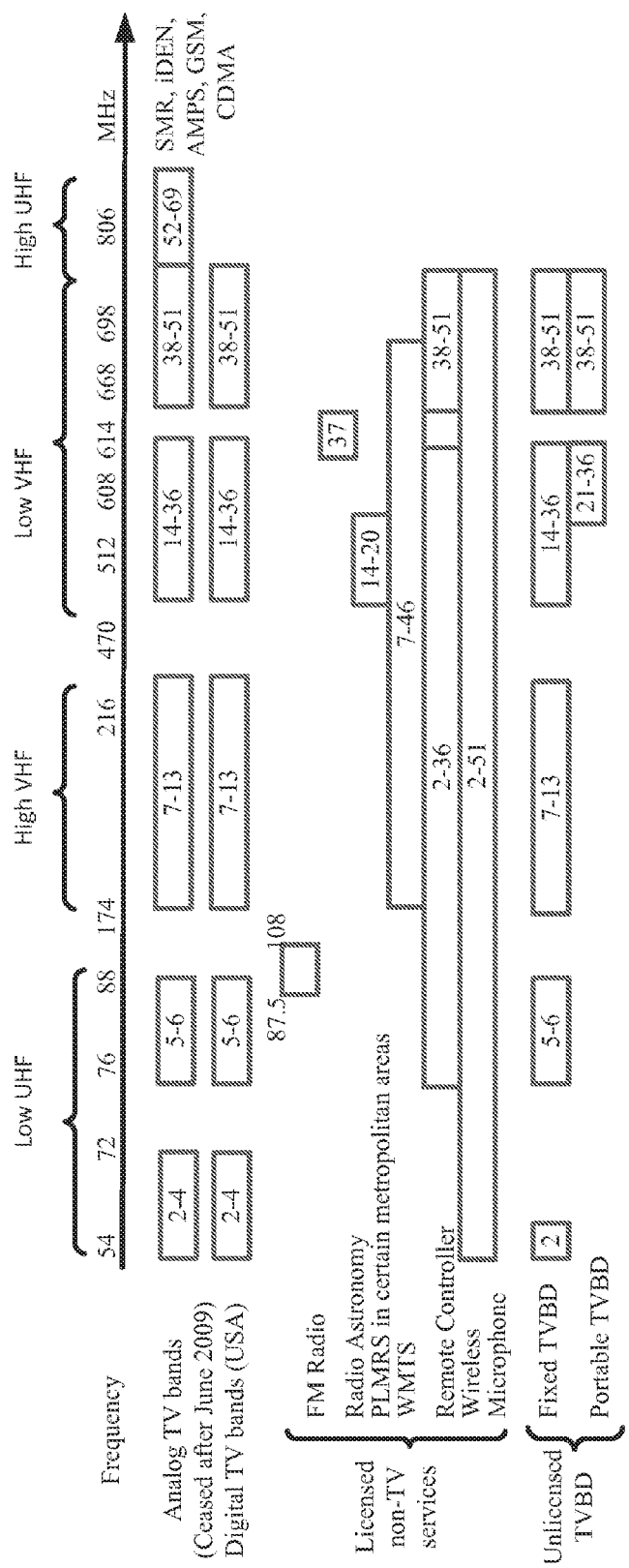
FIG. 1A illustrates exemplary TV band spectrum usage in the United States.

FIG. 1A shows exemplary TV band spectrum usage. Fixed TVBDs may operate on channels 2 to 51, which may not include channels 3, 4, 37. TVBDs may not operate on the same or the first adjacent channel to a channel used by TV services.

Figure 1B:
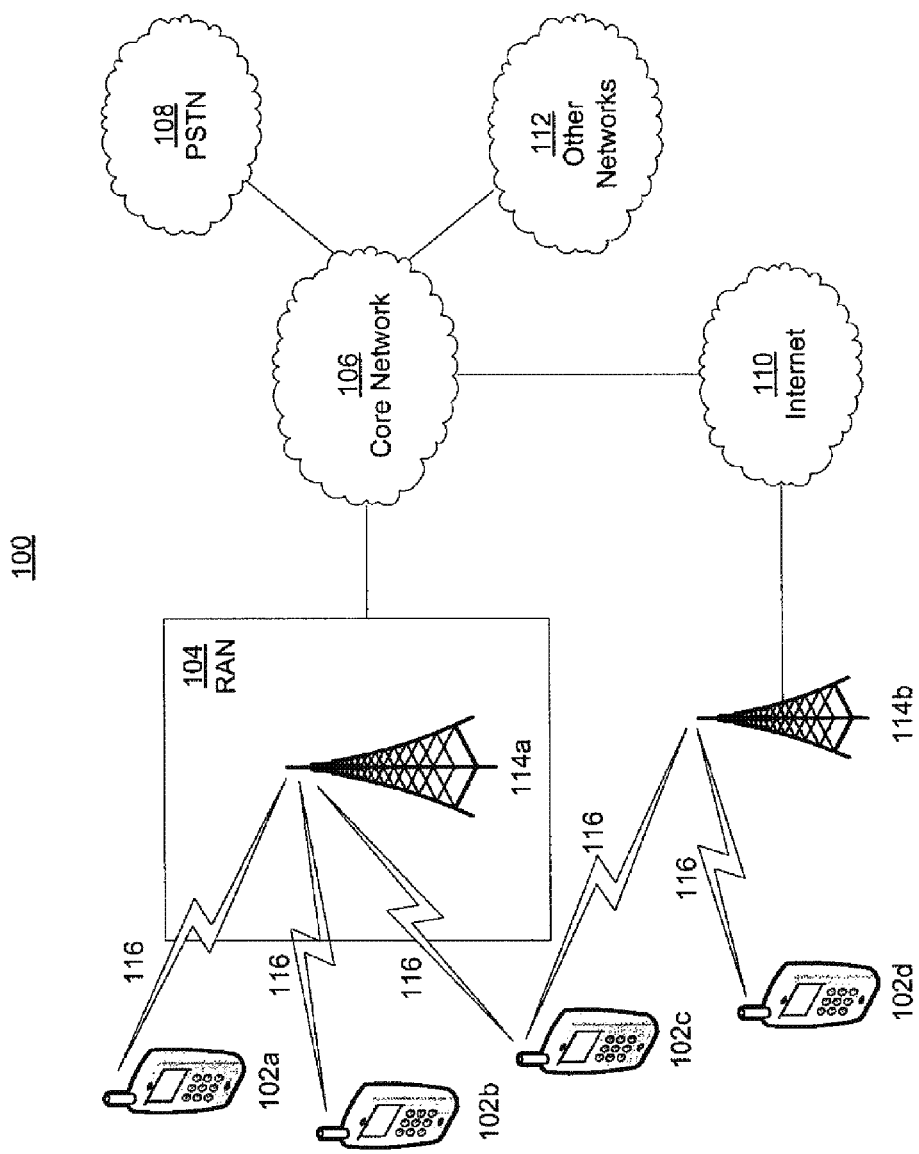
FIG. 1B illustrates an exemplary communication system in which one or more disclosed embodiments may be implemented.

FIG. 1B is a diagram of an exemplary communication system 100 in which one or more disclosed embodiments may be implemented. The communication system 100 may be a multiple access system that may provide content, such as voice, data, video, messaging, and/or broadcast, among others, to multiple wireless users. The communication system 100 may enable multiple wireless users to access such content through the sharing of system resources, including wireless bandwidth. For example, the communication systems 100 may use one or more channel access methods, such as code division multiple access (CDMA), time division multiple access (TDMA), frequency division multiple access (FDMA), orthogonal FDMA (OFDMA), and/or single-carrier FDMA (SCFDMA), among others.

As shown in FIG. 1B, the communication system 100 may include: (1) WTRUs 102a, 102b, 102c and/or 102d; (2) a RAN 104; a CN 106; a public switched telephone network (PSTN) 108; the Internet 110; and/or other networks 112. It is contemplated that the disclosed embodiments may include any number of WTRUs, base stations, networks, and/or network elements. Each of the WTRU s 102a, 102b, 102c or 102d may be any type of device configured to operate and/or communicate in a wireless environment. By way of example, the WTRUs 102a, 102b, 102c or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, and/or consumer electronics, among others.

The communication system 100 may also include a base station 114a and a base station 114b. Each of the base stations 114a or 114b may be any type of device configured to wirelessly interface with at least one of the WTRU s 102a, 102b, 102c, and/or 102d to facilitate access to one or more communication networks, such as the CN 106, the Internet 110, and/or the other networks 112. By way of example, the base stations 114a and 114b may be a base transceiver station (BTS), a Node-B, an eNode B, a Home Node B, a Home eNode B, a site controller, an access point (AP), and/or a wireless router, among others. While the base stations 114a, 114b are each depicted as a single element, it is contemplated that the base stations 114a and 114b may include any number of interconnected base stations and/or network elements.

The base station 114a may be part of the RAN 104, which may include other base stations and/or network elements (not shown), such as a base station controller (BSC), a radio network controller (RNC), and/or relay nodes, among others. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three cell sectors. In certain exemplary embodiments, the base station 114a may include three transceivers, i.e., one for each sector of the cell. In various exemplary embodiments, the base station 114a may employ multiple-input multiple output (MIMO) technology and, may utilize multiple transceivers for each sector of the cell.

The base stations 114a and 114b may communicate with one or more of the WTRUs 102a, 102b, 102c and/or 102d over an air interface 116, which may be any suitable wireless communication link (e.g., radio frequency (RF), microwave, infrared (IR), ultraviolet (UV) and/or visible light, among others). The air interface 116 may be established using any suitable radio access technology (RAT).

As noted above, the communication system 100 may be a multiple access system and may employ one or more channel access schemes, such as CDMA, TDMA, FDMA, OFDMA, and/or SC-FDMA, among others. For example, the base station 114a in the RAN 104 and the WTRUs 102a, 102b and 102c may implement a RAT such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+).

HSPA may include High-Speed Downlink Packet Access (HSDPA) and/or High-Speed Uplink Packet Access (HSUPA).

In certain exemplary embodiments, the base station 114a and the WTRUs 102a, 102b and 102c may implement a RAT such as Evolved UMTS Terrestrial Radio Access (E-UTRA), which may establish the air interface 116 using Long Term Evolution (LTE) and/or LTE-Advanced (LTE-A).

In certain exemplary embodiments, the base station 114a and the WTRUs 102a, 102b and 102c may implement RAT such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), and/or GSM EDGE (GERAN), among others.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, and/or a campus, among others. In certain exemplary embodiments, the base station 114b and the WTRUs 102c and 102d may implement a RAT such as IEEE 802.11 to establish a wireless local area network (WLAN). In certain exemplary embodiments, the base station 114b and the WTRUs 102c and 102d may implement a RAT such as IEEE 802.15 to establish a wireless personal area network (WPAN). In certain exemplary embodiments, the base station 114b and the WTRUs 102c and 102d may utilize a cellular based RAT (e.g., WCDMA, CDMA2000, GSM, LTE, LTE-A, etc.) to establish a picocell or femtocell. As shown in FIG. 1B, the base station 114b may have a direct connection to the Internet 110. The base station 114b may access the Internet 110 via the CN 106 or may access the Internet directly or through a different access network.

The RAN 104 may be in communication with the CN 106, which may be any type of network configured to provide voice, data, applications, and/or voice over internet protocol (VoIP) services to one or more of the WTRUs 102a, 102b, 102c and/or 102d. For example, the CN 106 may provide call control, billing services, mobile location-based services, pre-paid calling, Internet connectivity, video distribution, and/or perform high-level security functions, such as user authentication, among others. Although not shown in FIG. 1B, it is contemplated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN employing a GSM radio technology.

The CN 106 may also serve as a gateway for the WTRUs 102a, 102b, 102c and 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communication networks owned and/or operated by other service providers. For example, the other networks 112 may include another CN connected to one or more RANs, which may employ the same RAT as the RAN 104 or a different RAT.

Some or all of the WTRUs 102a, 102b, 102c and 102d in the communication system 100 may include multi-mode capabilities, (e.g., the WTRUs 102a, 102b, 102c and/or 102d may include multiple transceivers for communicating with different wireless networks over different wireless links). For example, the WTRU 102c may be configured to communicate with the base station 114a, which may employ a cellular-based RAT, and with the base station 114b, which may employ an IEEE 802 RAT.

Figure 1C:
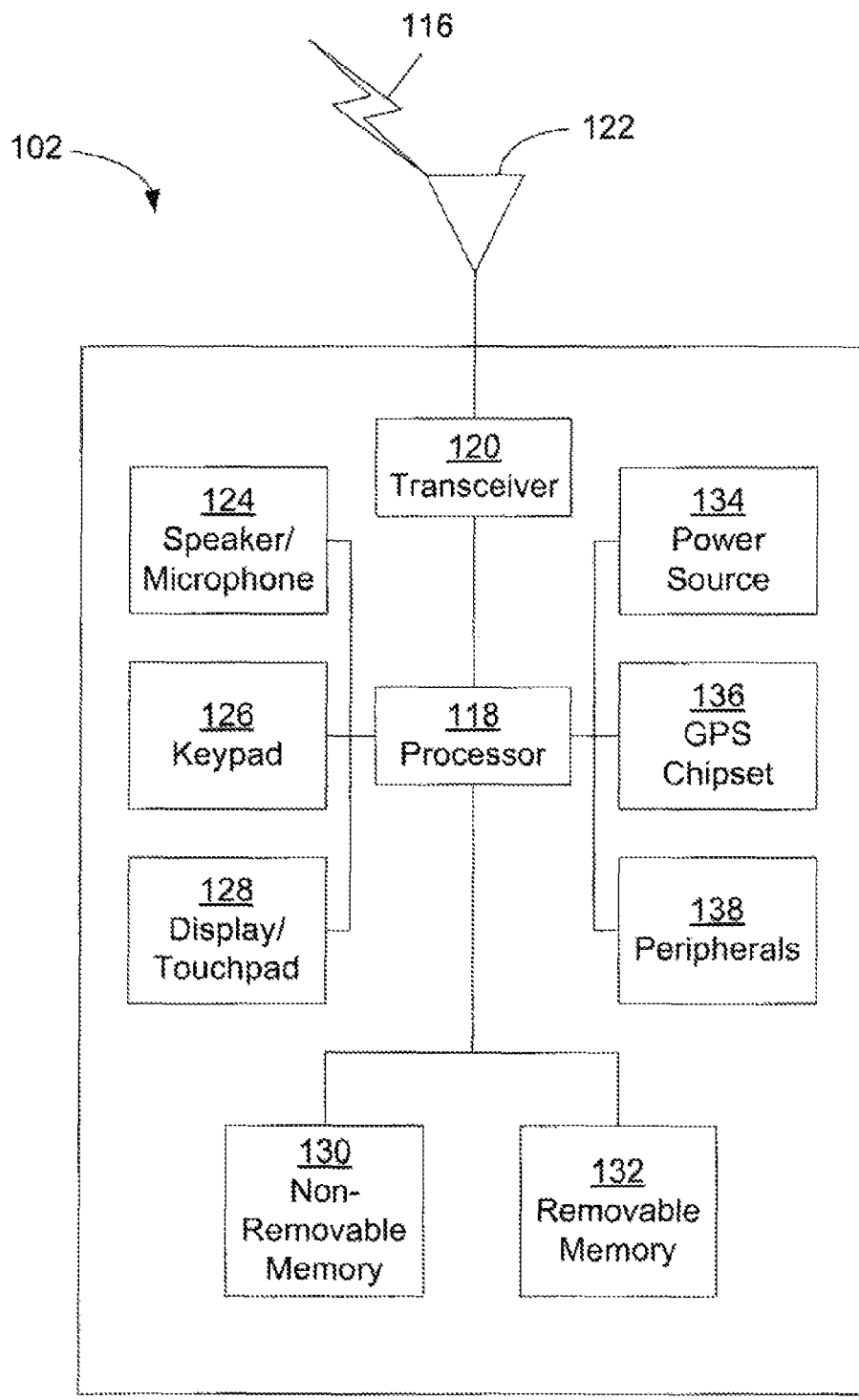
FIG. 1C illustrates an exemplary wireless transmit/receive unit (WTRU) that may be used within the communication system illustrated in FIG. 1B.

FIG. 1C is a system diagram of an exemplary WTRU 102. As shown in FIG. 1C, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and/or other peripherals 138, among others. It is contemplated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), and/or a state machine, among others. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. Although FIG. 1C depicts the processor 118 and the transceiver 120 as separate components, it is contemplated that the processor 118 and the transceiver 120 may be integrated together in an electronic package or chip. The transmit/receive element 122 may be configured to transmit signals to, or receive signals from, a base station (e.g., the base station 114a) over the air interface 116. For example, in certain exemplary embodiments, the transmit/receive element 122 may be an antenna configured to transmit and/or receive radio frequency (RF) signals. In various exemplary embodiments, the transmit/receive element 122 may be an emitter/detector configured to transmit and/or receive infrared (IR), ultraviolet (UV), and/or visible light signals, for example. In some exemplary embodiments, the transmit/receive element 122 may be configured to transmit and receive both RF and light signals. It is contemplated that the transmit/receive element 122 may be configured to transmit and/or receive any combination of wireless signals.

Although the transmit/receive element 122 is depicted in FIG. 1C, as a single element, the WTRU 102 may include any number of transmit/receive elements 122 and/or may employ MIMO technology. In certain exemplary embodiments, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. The transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128

(e.g., a liquid crystal display (LCD) unit or organic light emitting diode (OLED) display unit). The processor 118 may output user data to the speaker/microphone 124, the keypad 126, and/or the display/touch pad 128. The processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of fixed memory storage device. The removable memory 132 may include a subscriber identity module (SIM) card, a memory stick, and/or a secure digital (SD) memory card, among others. In certain exemplary embodiments, the processor 118 may access information from, and store data in, memory that is not physically located at and/or on the WTRU 102, such as on a server or a home computer (not shown).

The processor 118 may be configured to receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), and/or lithium ion (Li-ion), among others), solar cells, and/or fuel cells, among others.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a* and/or 114*b*) and/or may determine its location based on the timing of the signals being received from two or more nearby base stations. It is contemplated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, and/or an Internet browser, among others.

Figure 1D:
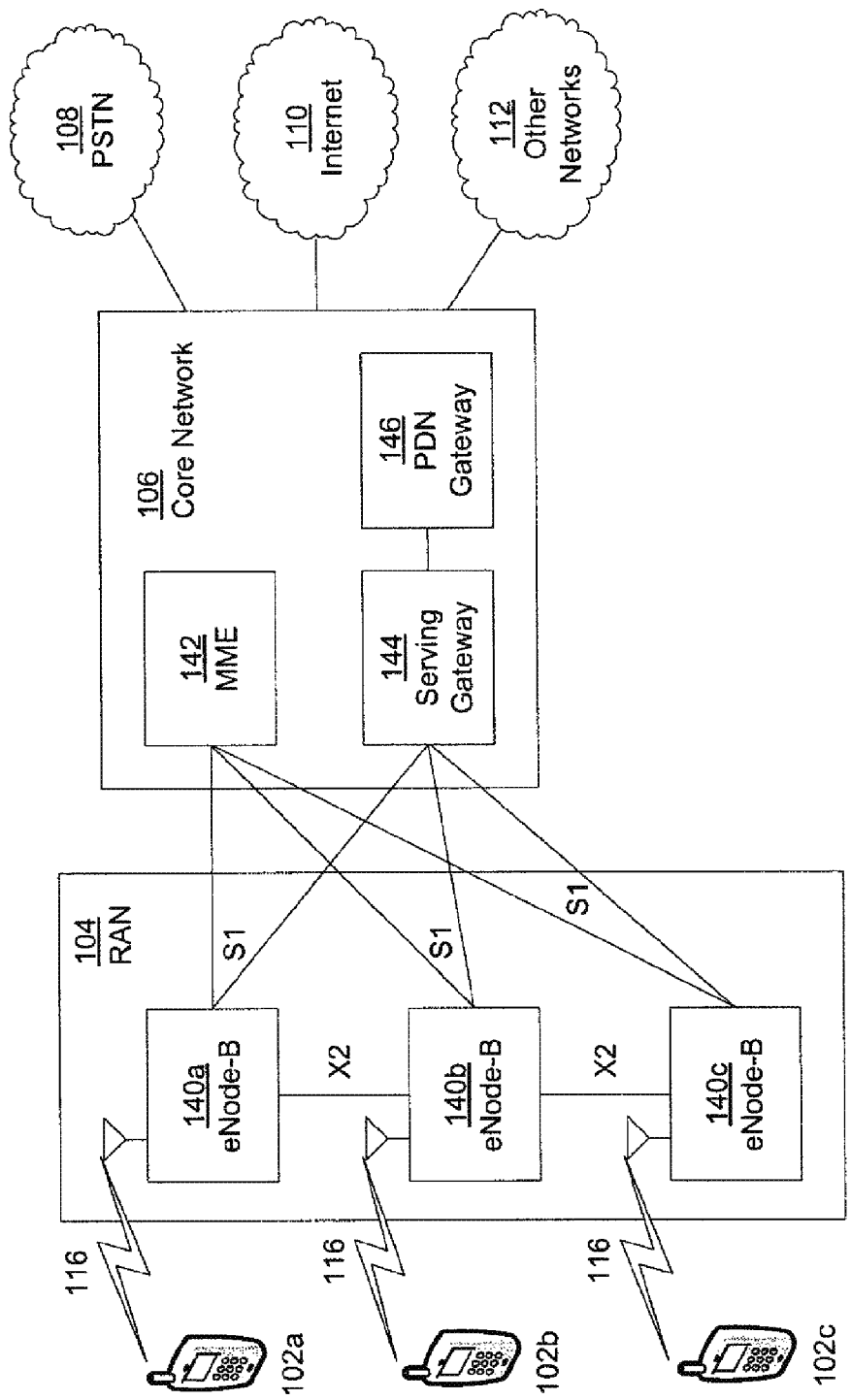
FIG. 1D illustrates an exemplary radio access network (RAN) and an exemplary core network (CN) that may be used within the communication system illustrated in FIG. 1B.

FIG. 1D is a system diagram of the RAN 104 and the CN 106 according to certain exemplary embodiments. The RAN 104 may employ the E-UTRA radio technology to communicate with the WTRU s 102*a*, 102*b* and 102*c* over the air interface 116. The RAN 104 may be in communication with the CN 106.

Although the RAN 104 is shown to include eNode-Bs 140*a*, 140*b* and 140*c*, it is contemplated that the RAN 104 may include any number of eNode-Bs. The eNode-Bs 140*a*, 140*b* and 140*c* may each include one or more transceivers for communicating with the WTRUs 102*a*, 102*b* and 102*c* over the air interface 116. The eNode-B 140*a*, for example, may use MIMO technology or may use multiple antennas to transmit wireless signals to, and receive wireless signals from, the WTRU 102*a*.

Each of the eNode-Bs 140*a*, 140*b* and/or 140*c* may be associated with a particular cell (not shown) and may be configured to handle radio resource management decisions, handover decisions, and/or scheduling of users in the UL and/or downlink (DL), among others. As shown in FIG. 1D, the eNode-Bs 140*a*, 140*b* and 140*c* may communicate with one another over an X2 interface.

The CN 106 may include a mobility management gateway (MME) 142, a SeGW 144, and a packet data network (PDN) gateway 146. Although each of the foregoing elements is depicted as part of the CN 106, it is contemplated that anyone of these elements may be owned and/or operated by an entity other than the CN operator.

The MME 142 may be connected to each of the eNode-Bs 142*a*, 142*b* and/or 142*c* in the RAN 104 via an S1 interface and may serve as a control node. For example, the MME 142 may be responsible for: (1) authenticating users of the WTRUs 102*a*, 102*b* and 102*c*; (2) bearer activation/deactivation; and/or (3) selecting a particular SeGW during an initial attach (e.g., attachment procedure) of the WTRUs 102*a*, 102*b* and 102*c*, among others. The MME 142 may provide a control plane function for switching between the RAN 104 and other RANs that employ other RAT, such as GSM or WCDMA.

The serving gateway (SeGW) 144 may be connected to each of the eNode Bs 140*a*, 140*b* and 140*c* in the RAN 104 via the S1 interface. The SeGW 144 may generally route and forward user data packets to/from the WTRUs 102*a*, 102*b* and 102*c*. The SeGW 144 may perform other functions, such as anchoring user planes during inter-eNode B handovers, triggering paging when DL data is available for the WTRUs 102*a*, 102*b* and 102*c*, and/or managing and storing contexts of the WTRUs 102*a*, 102*b* and 102*c*, among others.

The SeGW 144 may be connected to the PDN gateway 146, which may provide the WTRUs 102*a*, 102*b* and 102*c* with access to packet-switched networks, such as the Internet 110, to facilitate communications between the WTRUs 102*a*, 102*b* and 102*c* and IP-enabled devices.

The CN 106 may facilitate communications with other networks. For example, the CN 106 may provide the WTRUs 102*a*, 102*b* and 102*c* with access to circuit-switched networks, such as the PSTN 108, to facilitate communications between the WTRUs 102*a*, 102*b* and 102*c* and traditional land-line communication devices. For example, the CN 106 may include, or may communicate with, an IP gateway (e.g., an IP multimedia subsystem (IMS) server) that may serve as an interface between the CN 106 and the PSTN 108. The CN 106 may provide the WTRUs 102*a*, 102*b* and 102*c* with access to the other networks 112, which may include other wired or wireless networks that are owned and/or operated by other service providers.

Figure 2:
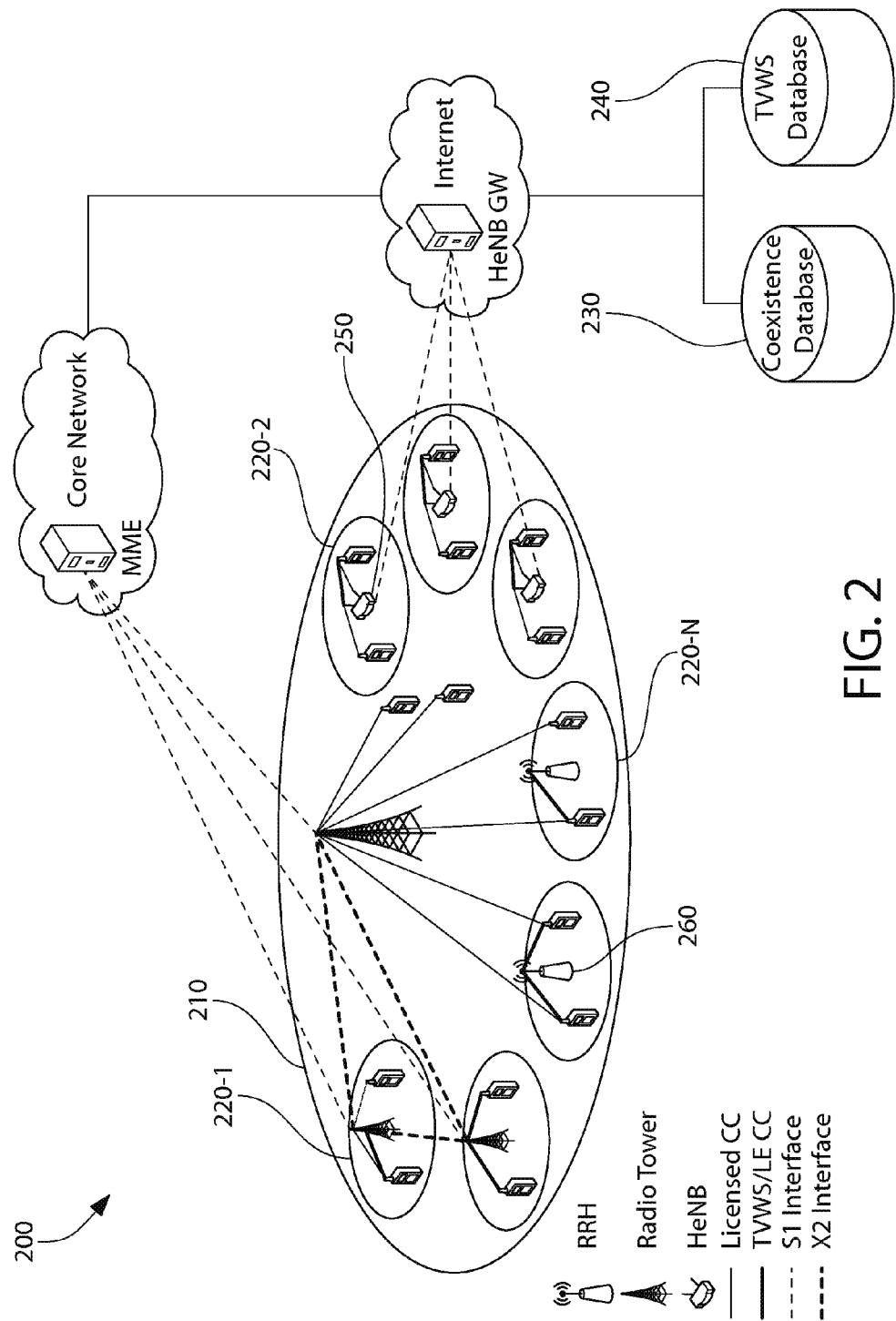
FIG. 2 illustrates an exemplary system deploying supplementary carriers to use Dynamic Spectrum Sharing (DSS) bands.

FIG. 2 shows an exemplary system 200 deploying supplementary carriers that may use Dynamic Spectrum Sharing (DSS) bands. DSS bands may include license-exempt bands (e.g., TVWS and ISM). A supplementary component carrier may operate in DSS bands. A supplementary component carrier may be a secondary component carrier, an extension carrier, or carrier type that may be created. The system may use heterogeneous network deployments that may make use of advanced DSS carrier aggregation, e.g., to provide hotspot coverage. The heterogeneous network architecture may include an LTE macro cell 210 and an underlay of pico/femto/RRH cells 220-1, 220-2 . . . 220-N that may aggregate licensed and DSS bands. The macro cells 210 may provide service continuity. The pico/femto cells 220-1, 220-2 . . . 220-N may be used to provide hot spot coverage. A coexistence database 230 and mechanisms to coordinate operation with other secondary networks and/or users operating in DSS bands may be implemented. A TVWS database 240 may be used to protect incumbent users operating in the TVWS band. There may be infrastructure to support dynamic spectrum trading across both licensed and DSS bands. The infrastructure may employ a multi-phased approach targeting HeNB 250 for Phase I and RRH/picocell campus type deployments 260 for Phase II.

Figure 3:
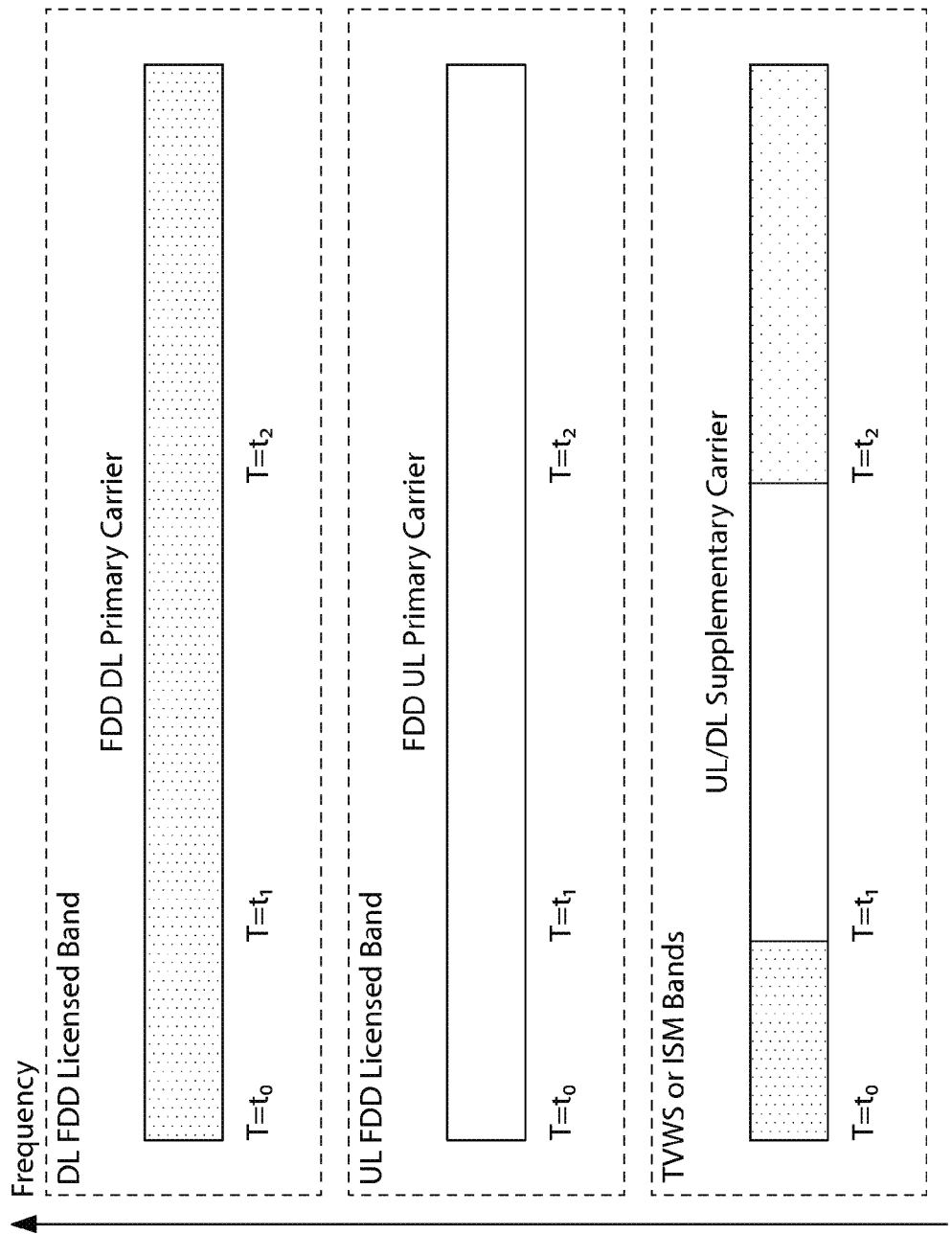
FIG. 3 illustrates an exemplary spectrum allocation in which the FDD licensed spectrum may be the primary carrier.

FIG. 3 shows an exemplary spectrum allocation in which the FDD licensed spectrum may be the primary carrier. The FDD licensed spectrum may be used as the primary carrier or primary cell and a supplementary DSS carrier may be dynamically aggregated with the primary carrier in the UL and/or DL for a given time interval (e.g., a subframe, a frame, or some other interval, etc.). This may ensure that the UE (e.g., a radio or other device) operating in the DSS spectrum does not transmit and receive in the DSS band simultaneously.

Certain exemplary embodiments may include an FDD primary cell aggregating a dynamic FDD supplementary carrier in which the Primary FDD carrier (e.g., licensed carrier) may aggregate with a supplementary carrier based on the existing FDD frame structure and which may dynamically change the supplementary carrier to aggregate in the DL and/or the UL.

Figure 4:
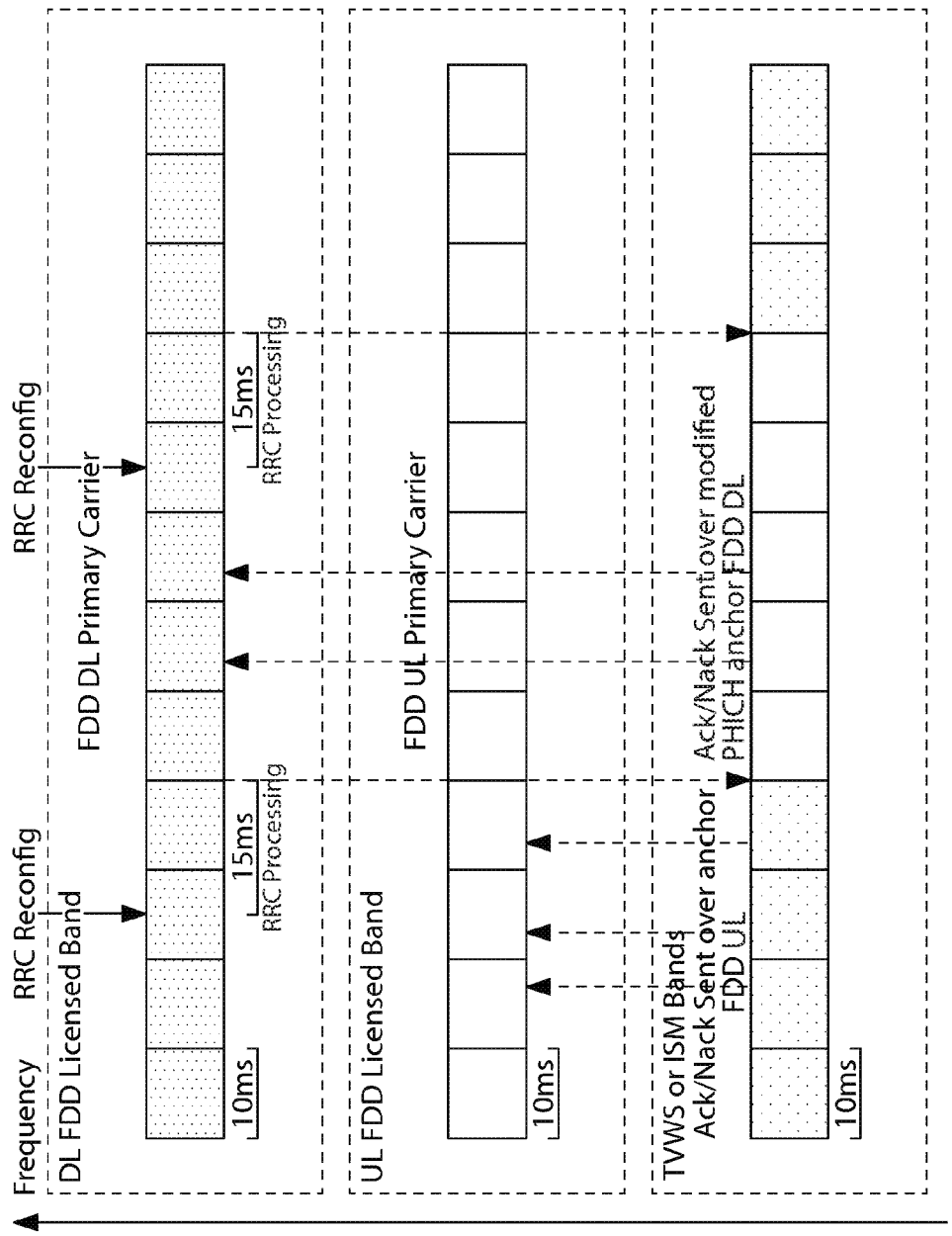
FIG. 4 illustrates an exemplary spectrum assignment for a RRC triggered scenario.

FIG. 4 illustrates an exemplary spectrum assignment for a Radio Resource Control (RRC) triggered scenario. The direction of the aggregation may be dynamically changed through an RRC reconfiguration sent over the primary carrier. As an example, LTE may deliver and process RRC messages within 15 ms in connected mode.

Figure 5:
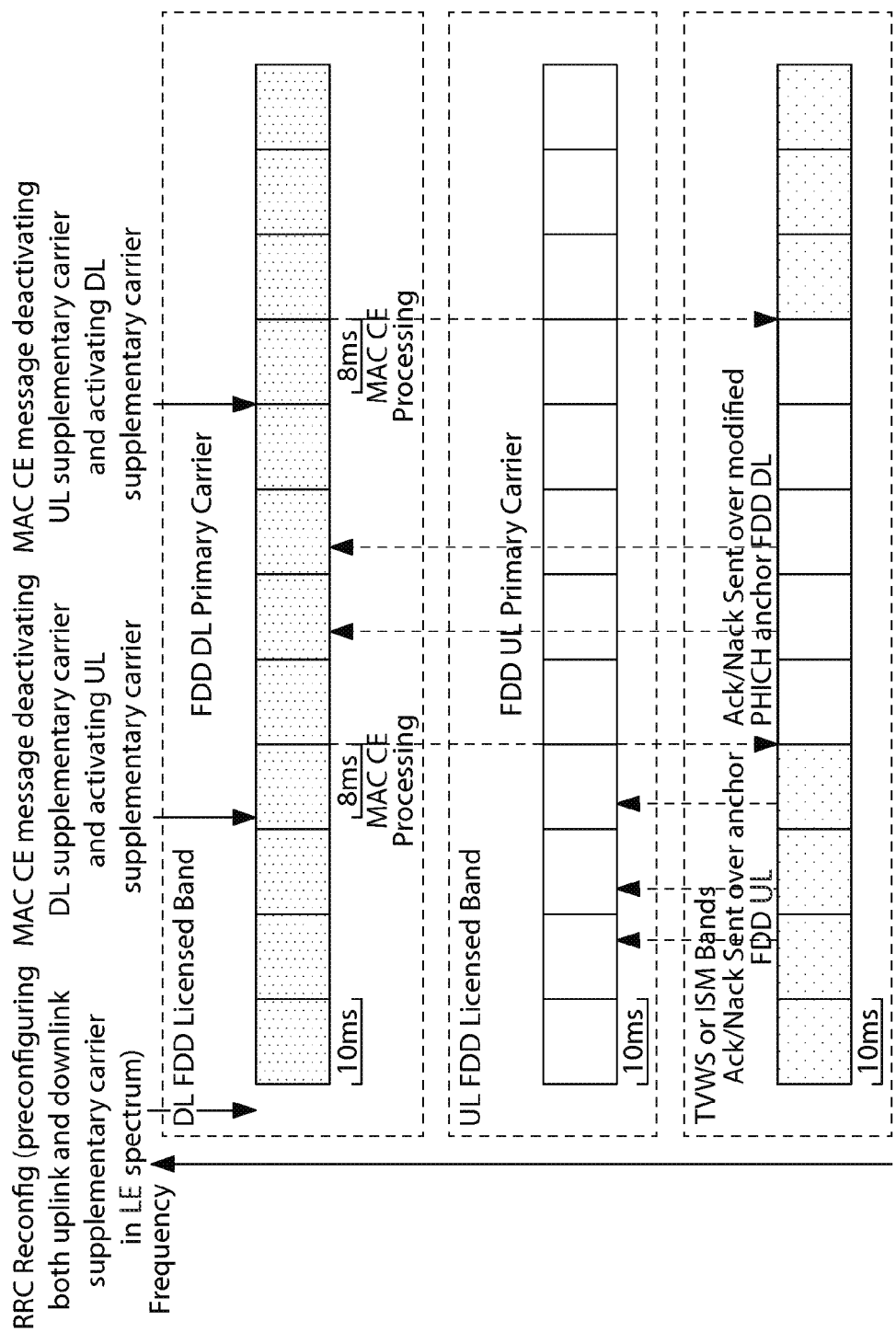
FIG. 5 illustrates an exemplary spectrum allocation in a MAC CE triggered scenario.

FIG. 5 illustrates an exemplary spectrum allocation in a MAC CE triggered scenario. The direction of the aggregation may be dynamically changed through a MAC CE command sent over the primary carrier. RRC reconfiguration messages may be used to pre-configure the UL and/or DL supplementary carrier in the DSS spectrum. A MAC CE message may subsequently activate the supplementary carrier in one direction and deactivate it in the other direction, e.g., as shown in FIG. 5.

An UL and DL frame timing may be implemented. For example, a MAC scheduler and buffering scheme may be used to retain temporarily deactivated UL or downlink Mac Protocol Data Units (MPDUs) when switching the supplementary carrier from DL to UL or vice versa. FDD carriers may make aggregation synchronous and additional memory may not be used.

A Guard Period (GP) may be added for dynamic FDD prior to a frame boundary when switching the supplementary carrier from DL to UL or vice versa. The added GP may be configured based on the range or size of the cell. It may also be changed and/or reconfigured dynamically, e.g., via RRC reconfiguration messages.

For carrier aggregation, the Physical Hybrid ARQ Indicator Channel (PHICH) may be transmitted on the DL carrier (e.g., limited to one or more DL carriers) that may have been used to transmit the UL grant. The timing of responses to be expected on the PHICH may differ in FDD and TDD. For FDD, DL ACK/NACK may be sent 4 subframes after the UL transmission, in TDD this may be variable. The mapping of PHICH resources may differ in FDD and TDD. In FDD, the frames (e.g., each frame) may have the same number of PHICH resource elements in the first OFDM symbol. In TDD, the number of PHICH resource elements may depend on the subframe. In TDD, the size of the PHICH resources may be adjusted based on the UL/DL configuration (e.g., a UL-heavy configuration may have more resource elements allocated to the PHICH). In Rel-10, PHICH collisions may be limited to consideration in the case of cross-carrier scheduling (e.g., resolved by DMRS cyclic shift mechanism).

If an FDD carrier is used in whitespace (e.g., the TVWS), it may result in an UL heavy configuration, which may have a potential for PHICH collisions. Certain exemplary embodiments may define additional PHICH allocations which may be sent using (e.g., over) the RRC reconfiguration message to configure the supplementary carrier. The PHICH configurations may be changed or adjusted when the supplementary carrier is reconfigured from UL to DL, e.g., in order to adapt to the load (e.g., UL heavy or DL heavy) of the channel. Allocation and configuration of the Physical Downlink Control Channel (PDCCH) in the licensed band may be modified based on PHICH allocations that may occur in the first OFDM symbol of each subframe.

When the DSS band carrier is set to DL, the DSS band UL control information like channel quality indicator (CQI)/precoding matrix indicator (PMI)/rank indicator (RI), ACK/NACK/discontinuous transmission (DTX) may be sent over the primary carrier FDD UL. The format of the control information may be updated to include corresponding bit fields on FDD UL for that purpose.

Figure 6:
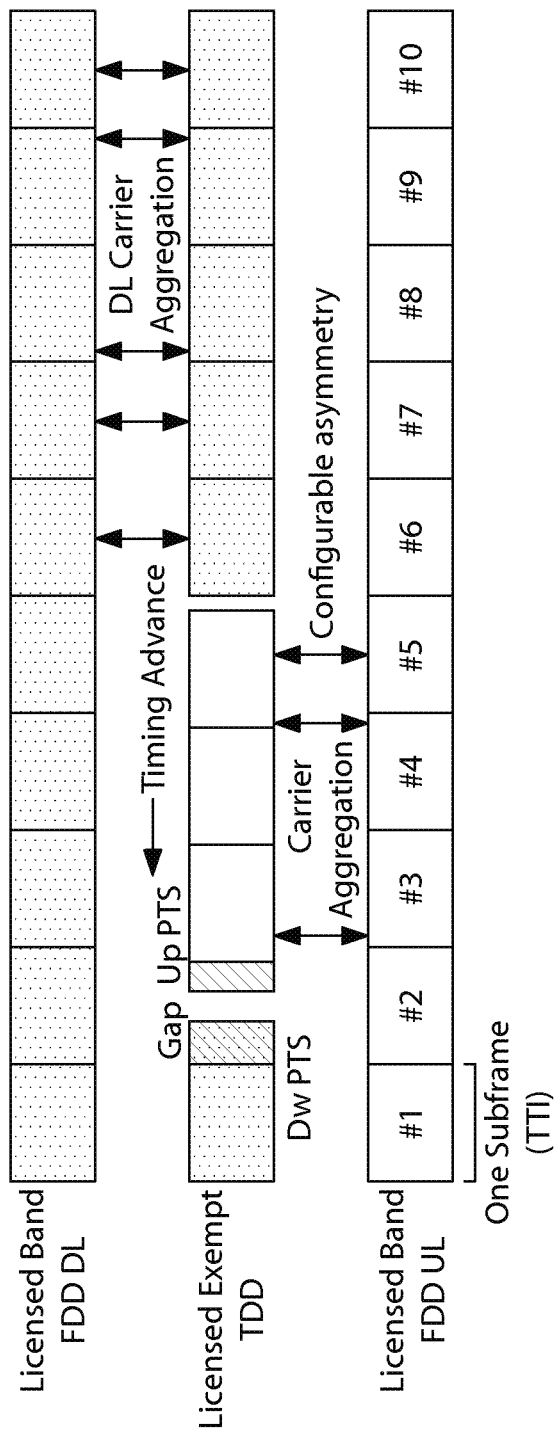
FIG. 6 illustrates an exemplary spectrum allocation in which a FDD primary cell aggregates with a Time Division Duplexing (TDD) supplementary carrier.

FIG. 6 shows an exemplary spectrum allocation for an FDD primary cell that aggregates with a TDD supplementary carrier. Certain exemplary embodiments may be based on a primary FDD carrier (e.g., licensed) aggregating a supplementary carrier based on an existing LTE-TDD frame. Multiple UL and DL supplementary transmission opportunities may exist in each frame and may depend on the asymmetry configuration (e.g., configuration #3 is shown).

TDD operation may provide for the UL and/or DL configuration being fixed, e.g., for the entire cell, so the PHICH resources allocated for UL/DL may be fixed. A dynamic UL and DL configuration may be implemented to dynamically change the configuration of the UL/DL and the PHICH resources allocated for the UL/DL. For example, in TDD, the active WTRU may be sent UL/DL reconfigurations, e.g., through RRC reconfiguration messages. This may allow the UL/DL configuration to be adjusted to the traffic load over the cell. Idle mode WTRUs may not be impacted by this change, e.g., as camping on the primary carrier or multiple UL/DL configurations may be preconfigured through the RRC message and activated by the MAC CE message. Since CA may not be used in IDLE mode, the change of the UL/DL configuration on these WTRUs may be transparent until they move to RRC_CONNECTED, e.g., at which time they may have received the current UL/DL configuration to be used.

A guard period (GP) may be desired in the special subframe for the TDD supplementary carrier. This GP duration may be configurable through RRC reconfiguration. This may allow for the configuration to dynamically adjust to the range of the cell and the frequency band of the DSS spectrum being used (e.g., the propagation characteristics of the signal may change as the frequency is changed). A preconfigured GP value per frequency band may be used. This preconfigured GP may be based on the expected cell size and may be modified by the RRC message when the frequency band of the supplementary carrier is changed.

Periodicity and timing of the Sounding Reference Signal (SRS) may be controlled by upper layer parameters and may be different between TDD and FDD. The SRS may be transmitted in the UL pilot time slot (UpPTS) in TDD (e.g., UpPTS may be reserved for SRS and Format 4 PRACH). Different subframe configurations may be sent for each carrier, for example, when TDD and FDD are configured (e.g., when a TDD supplementary carrier may be used). This SRS configuration may be sent over the primary carrier. Fields may be added to the SRS configuration to identify whether the configuration corresponds to TDD or FDD.

In TDD special frames may have no Physical UL Control Channel (PUCCH) mapped to them. The PUCCH may be transmitted on (e.g., limited to transmission on) the primary cell in an FDD fashion.

The physical random access channel (PRACH) procedures and structure in TDD may be different than FDD. The PRACH in LTE may include six resource blocks (RBs) adjacent to the PUCCH in predetermined subframes. For a given PRACH configuration (e.g., from S1B2) mapping to specific subframes may be different in TDD and FDD. In FDD, one PRACH resource may be available per subframe. In TDD, multiple PRACH resources may be in a given subframe (e.g., to account for fewer UL subframes in a frame). The offset between PRACH resources in a subframe may be given by the upper layers. Preamble format 4 may be used (e.g., by itself) in TDD, for example, in which a short preamble may be used to fit into UpPTS of the special subframe.

The PRACH may be performed in the primary cell, which may be FDD. The configuration, timing, and procedure for the PRACH may follow the FDD case. The network may trigger additional PRACH to be performed on the supplementary carrier in the event that the timing alignment between the primary and supplementary carrier may be different, e.g., due to a large frequency separation. In such a case, the RRC reconfiguration associated with adding the supplementary carrier may define the specific Random Access Channel (RACH) configuration to be used on the supplementary carrier, which may include a TDD RACH procedure. The RRC configuration that may be sent over the FDD carrier may indicate that the RACH configuration may be specific to the TDD carrier. This type of RACH may be triggered when the WTRU has data to send to the eNB or when the eNB has detected a timing drift between the primary and supplementary carriers.

When performing PRACH on the secondary carrier (e.g., using TDD), contention resolution may take place on the primary or supplementary carrier, e.g., in order to provide a larger number of available PRACH resources for the system.

UL power control may be implemented. Timing of UL power control for the PUSCH relative to the transmit power control (TPC) command may be different in TDD and FDD. An entity in the eNB may be implemented that may be aware of the timing difference between the power control changes on the TDD and FDD carriers and may apply the appropriate TPC command. If cross carrier scheduling is supported, TPC commands for FDD or TDD may be differentiated. This may be performed by adding a field to the PDCCH for the TPC command or using carrier specific schedule for the TPC.

In LTE, TDD may support bundling of multiple ACK/NACKs into a single ACK/NACK to be sent in the UL subframe. FDD may not support this mode (e.g., a single ACK may be sent for each received transport block). The ACK/NACK bundling may be controlled by the DL Assignment Index (DAI) sent in DL Control Information (DCI) on the PDCCH (e.g., 2 bits in length). These two bits may not be present in FDD mode DCI formats. When multiple serving cells are configured, the ACK/NACK bundling may not be performed; multiplexing may be used. The ACK/NACK repetition (e.g., that may be configured by upper layers) in TDD mode may be applied for the ACK/NACK bundling and may not be used for the ACK/NACK multiplexing.

The cross-carrier scheduling of DL resources may be allowed on the TDD supplementary carrier via the FDD carrier. For cross carrier scheduling, the FDD carrier may include the DAI in the DCI format and the additional modification in blind decoding of PUCCH may be performed. Because the ACK/NACK may be sent on the PUCCH, bundling may be supported on the FDD UL carrier (e.g., the eNB may be able to decode the PUCCH related to the bundled information). The bundling operation may be performed relative to the transport blocks received in the TDD carrier; the bundled ACK/NACKs may be sent over the FDD carriers. The bundled ACK/NACK may be sent over the TDD (e.g., supplementary carrier). In a combined TDD/FDD design, the ACK/NACK may be sent on the primary carrier and/or the secondary carrier, e.g., based on Rel-10 rules. For example, the ACK/NACK may be sent on the secondary carrier if a PUSCH has been allocated on the secondary carrier, and no PUSCH has been allocated on the primary carrier.

For Carrier Aggregation, the PHICH may be transmitted on the DL carrier that was used to transmit the UL grant. The timing of responses that may be expected on the PHICH may differ in FDD and TDD. For FDD, the DL ACK/NACK may be sent four subframes after the UL transmission. In TDD, this timing may be variable (e.g., when the DL ACK/NACK may be sent may not be fixed, for example, the number of subframes after the UL transmission when the DL ACK/NACK may be sent may not be fixed). The mapping of the PHICH resources may differ for FDD and TDD. In FDD, each frame may have the same number of PHICH resource elements in the first OFDM symbol. In TDD, the number of the PHICH resources may depend on the subframe. In TDD, the size of the PHICH resources may be adjusted based on the UL/DL configuration (e.g., a UL-heavy configuration may have more resource elements allocated to the PHICH). PHICH collisions may be considered (e.g., may be limited to consideration) for the case of cross-carrier scheduling and may be resolved by a Demodulation Reference Signal (DMRS) cyclic shift mechanism.

The joint TDD/FDD approach may send the PHICH on the supplementary TDD carrier, e.g., to make use of the adjustable PHICH resources available on this carrier.

Some DCI Formats on the PDCCH may be different between TDD and FDD (e.g. the DCI format 1 may be three bits for the Hybrid Automatic Repeat Request (Hybrid ARQ or HARQ) process and two bit DAI for FDD; and it may be four bits for HARQ process and no DAI for TDD. If cross carrier scheduling is being used on the primary carrier, a PDCCH search space may be created and allocated to decode TDD and FDD DCI formats that may be separate from the FDD PDCCH search space. This may simplify blind decoding of the PDCCH.

The UL grants may be signaled by the PDCCH using DCI format 0. In FDD, the UL grant may start four subframes after the DCI format 0 is received (e.g., the DCI format 0 may also be different for TDD and FDD). In TDD, the UL index in DCI format 0 may specify the timing of the UL grant. In order to perform cross-carrier scheduling in the UL with a DSS supplementary TDD carrier, a TDD DCI format 0 may be created and used for alignment with the FDD DCI format. The information from the DCI sent on the FDD carrier may specify (e.g., indicate) whether the UL grant may be specific to the FDD or TDD carrier, and/or when it may be scheduled if it is indicated to be specific to the TDD carrier.

To support DL heavy Carrier Aggregation (CA) configurations, PUCCH format 3, may allow a larger number of bits for the ACK/NACK (e.g., when format 1b with channel selection may not have sufficient bits for the ACK (e.g., the used ACK)). In FDD ten bits may be allocated in PUCCH format 3. In TDD: twenty bits may be allocated in the PUCCH format 3. The ACK/NACK may be treated as a supplementary TDD carrier or as an FDD supplementary carrier. ACK/NACK bundling may not be implemented as is the case for TDD because there may be an UL FDD carrier active (e.g., primary carrier).

CQI reporting may be modified. If a TDD carrier is used, the way in which system information (SI) is interpreted for CQI reporting may be different for the TDD or FDD carrier. A separate SI may be used for FDD and TDD carriers. Mixing TDD and FDD may be more complex for the scheduler. The scheduler may be able to handle (e.g., use) two different schedules of TDD and FDD to come up with the DL allocation decisions. The upper layer event reporting and measurements may be modified given different timing for CQI reports coming from the TDD and FDD carrier.

Coexistence may be implemented. Spectrum sharing among secondary users may comprise an effective use of the DSS bands. If it is not coordinated well, the DSS bands may be left unoccupied, which may result in a waste of frequency bands, or heavily accessed by secondary users, e.g., causing significant interference to each other. A coexistence mechanism may be desirable. It may enable an effective usage of the DSS bands and may improve the communication quality of the secondary networks. Opportunistic access to DSS bands may be disclosed herein.

A database enabled coexistence solution may be used. A network may include a Coexistence Manager and Policy Engine that may be used to coordinate opportunistic use of DSS bands with other secondary users/networks. The Coexistence Manager of a given network may include interfaces to the TVWS/Coexistence databases, network devices, Coexistence Managers of other networks, etc. Location based DSS band allocations may be distributed to eNBs/HeNBs or centralized at the CN. The Policy Engine may generate and enforce polices based on database information and/or rules (e.g., operator defined rules). Centralized hierarchical coexistence database management may be used. For example, a local database, which may be CN based, may be used to coordinate secondary usage within a given operators network, while an Internet based database may be used to coordinate secondary usage with external users/networks.

A distributed approach may be used, e.g., in which no centralized entity may exist to make spectrum allocation decisions. In this approach, the eNB/HeNB may be responsible for accessing the coexistence database, processing the spectrum sharing negotiation with neighbor eNB/HeNBs, and making spectrum allocation decisions.

A spectrum sensing coexistence solution may be implemented. The network may rely on spectrum sensing results to coexist with other secondary networks. In this approach, an entity at the eNB/HeNB may negotiate access to DSS bands. This entity may exchange sensing and/or channel occupancy information with neighboring eNBs/HeNBs. A centralized approach based on spectrum sensing may be used. A central entity in the CN may process the spectrum sensing results received from the HeNBs/eNBs and may make decisions about eNB/HeNB channel assignments.

Contention based coexistence may also be implemented. Carrier sensing may be performed for Clear Channel Assessment (CCA) prior to commencing with transmissions. The eNB may maintain control of grant and scheduling of transmission opportunities. Transmissions may be "gated" by the CCA.

Figure 7:
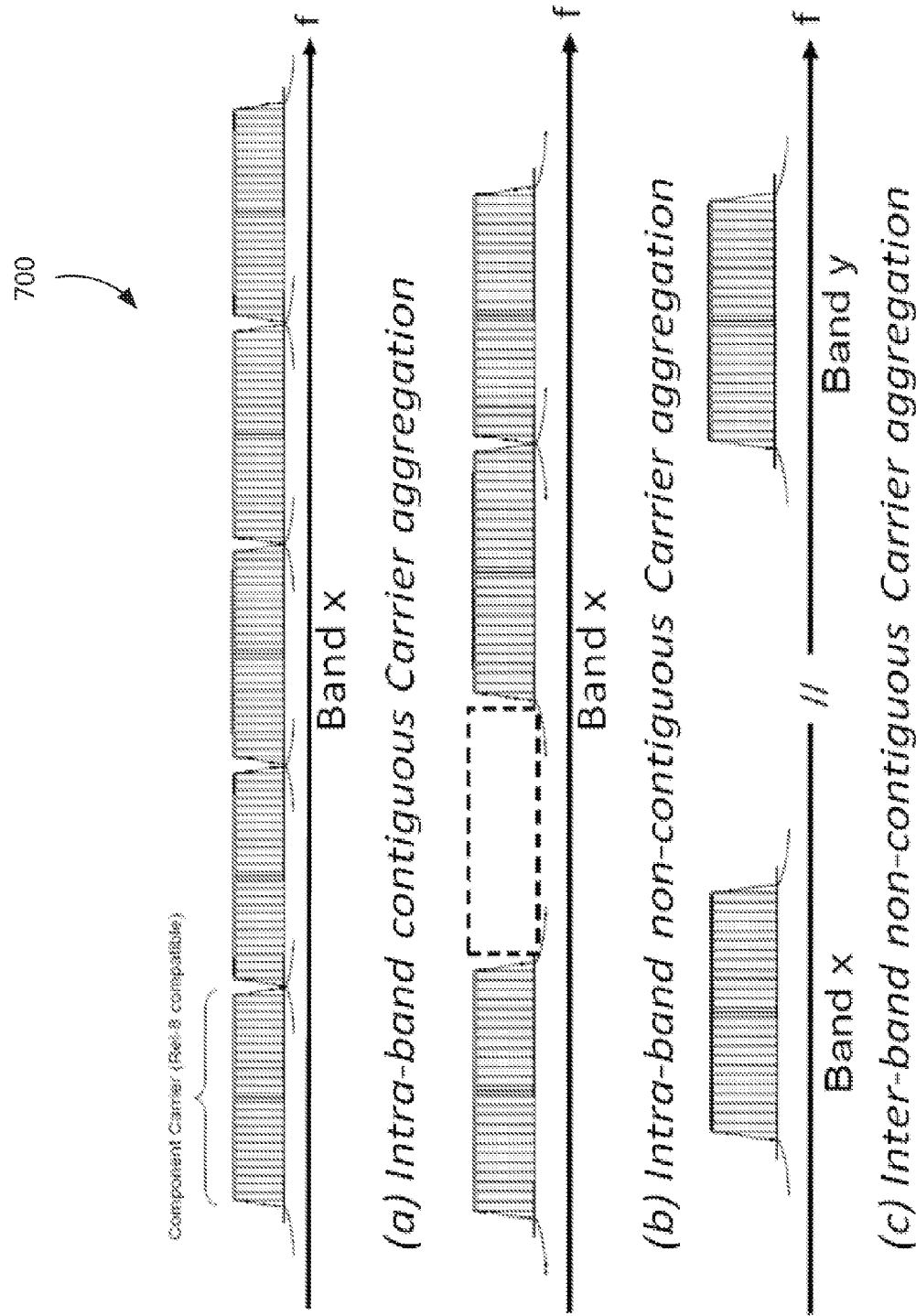
FIG. 7 illustrates exemplary inter-band and inter-band carrier aggregation (CA)

FIG. 7 is a diagram that illustrates exemplary inter-band and inter-band carrier aggregation (CA). Referring to FIG. 7, in LTE-A, two or more (e.g., up to 5) component carriers (CCs) may be aggregated to support wider transmission bandwidths, e.g., bandwidths of up to about 100 MHz. A UE (e.g., UE 102a), depending on its capabilities, may simultaneously receive and/or transmit on one or more CCs. The UE may be capable of aggregating a first number of differently sized CCs in the uplink (UL) and/or the same or a different number of such CCs in the downlink (DL). The CA may be supported for both contiguous and non-contiguous CCs. Exemplary scenarios may include one or more of the following as shown in FIG. 7: (1) intra-band contiguous CA in which CCs on a single band (e.g., frequency Band x) may be aggregated such that, for example, multiple adjacent CCs produce a contiguous bandwidth wider than 20 MHz; (2) intra-band non-contiguous CA in which CCs on a single band (e.g., frequency Band x) may be aggregated such that, for example, multiple adjacent CCs and at least one non-adjacent CC of the same band are aggregated to produce a non-contiguous bandwidth and may be used in a non-contiguous manner; and (3) inter-band non-contiguous CA in which CCs of different bands (e.g., frequency Bands x and y) may be aggregated.

One or more Primary Carriers (PrimCs) may be supplemented with one or more Supplementary Carriers (SuppCs or Supplementary Cells or SuppCells) in the DSS bands. A SuppC may be used in an opportunistic fashion in the DSS bands to increase bandwidth (e.g., dynamically increase bandwidth) using advanced CA to provide, for example, hot-spot coverage. A heterogeneous network architecture may include a macrocell that may provide service continuity and a pico/femto/RRH cell that may aggregate the licensed and DSS bands to provide increased bandwidth associated with the hot spot.

In an FDD system operating in the licensed band with an FDD PrimC, the SuppC in the DSS band may use FDD or TDD. Use of TDD in the DSS bands may provide one or more of the following: (1) TDD may use (e.g., may be limited to) one frequency channel or band, so, it may be simpler to identify (e.g., find) a single suitable DSS frequency channel, e.g., as opposed to finding, for example, a pair of separated frequency channels for UL and DL; (2) with two frequency channels that may be used by FDD, there may be more chances to interfere with incumbent users on one or more of the channels than TDD and the single channel configuration; (3) detection of incumbent users on a single frequency channel for TDD may be easier than for two channels associated with FDD; and (4) allowing asymmetric DL/UL data connection on a single frequency channel may enable a dynamic spectrum assignment system where channel bandwidth may be optimized.

Although FDD may use two channels or bands, it may be possible to use FDD in a single channel by splitting the channel or by using a single channel in one of an UL mode or a DL mode. These modes may be switched dynamically over time, e.g., to enable changes to bandwidth for both the UL and the DL. For example, a dynamic FDD system in the DSS bands may enable a SuppCell that may be configured dynamically to be one of a DL cell or an UP cell, or, switch at predefined times between UL and DL. TDD and dynamic FDD Supplementary Carriers may be described herein.

The Physical Hybrid ARQ Indicator Channel (PHICH) may be used for transmission of Hybrid ARQ acknowledgements (ACK/NACK) in response to UL-Shared Channel (SCH) transmissions. Since hybrid ARQ may use a reliable transmission for the PHICH, the error rate of the PHICH may be established to be at or below a threshold (e.g., at or below 0.1% ACK or NACK misdetections).

The PHICH may be transmitted by the eNB on specific resource elements that may be reserved for the PHICH transmission. Depending on the SI that may be transmitted in, for example, the Master Information Block (MIB), the PHICH may occupy resource elements in the PDCCH, for example, in the first OFDM symbol of a subframe (e.g., for a normal PHICH duration), or in the first 2 or 3 OFDM symbols of the subframe (e.g., for an extended PHICH duration)). The MIB may specify how much of the DL resources may be reserved for the PHICH through the PHICH-resource parameter.

Figure 8:
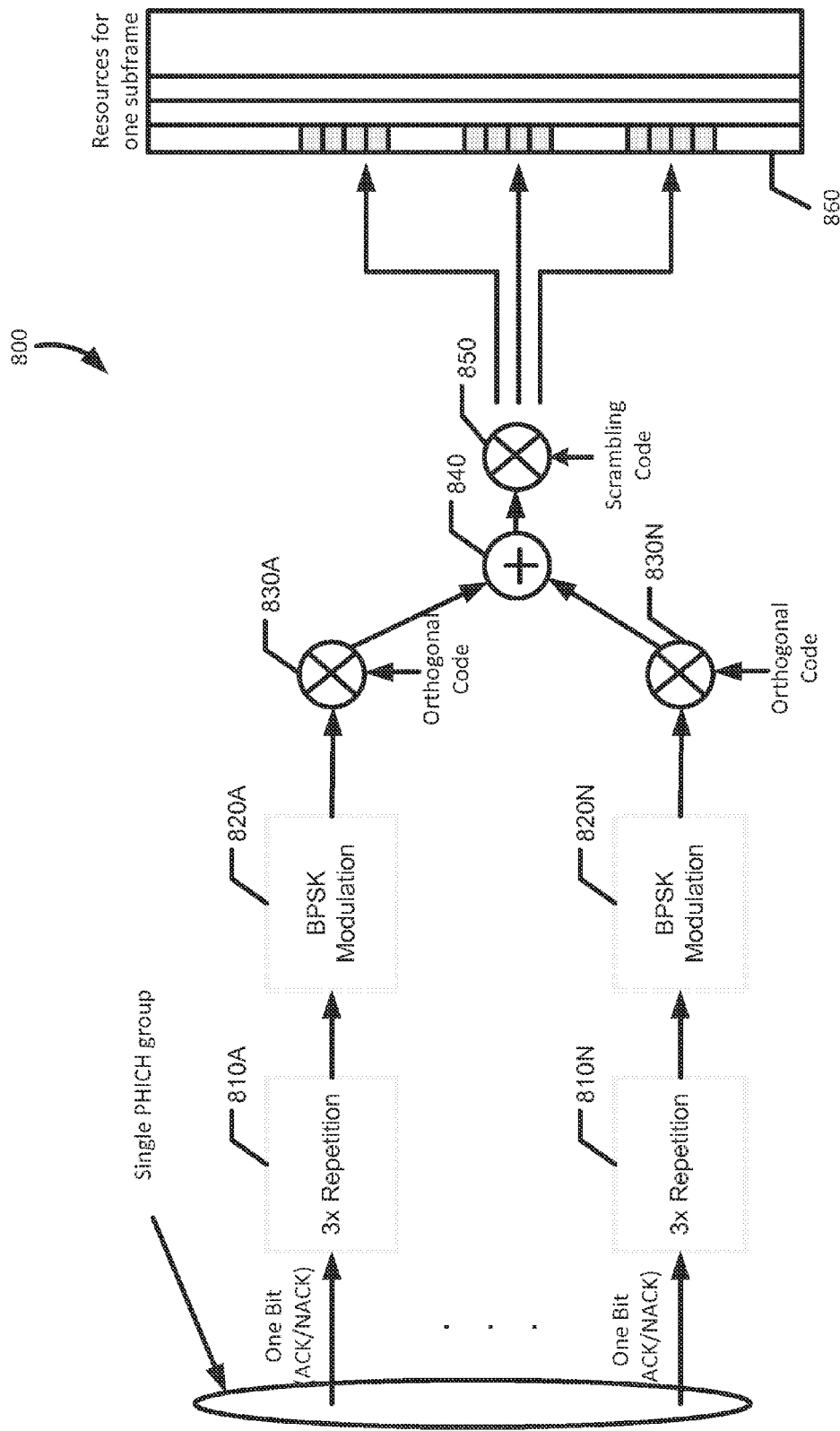
FIG. 8 illustrates an exemplary Physical Hybrid ARQ Indicator Channel (PHICH) group modulation.

FIG. 8 is a diagram that illustrates an exemplary Physical Hybrid ARQ Indicator Channel (PHICH) group modulation and mapping. Referring to FIG. 8, the PHICH group modulator 800 may include a plurality of repetition units 810A . . . 810N (e.g., 3× repetition units), a plurality of modulators 820A . . . 820N (e.g., BPSK or QPSK or other modulators, among others), a plurality of orthogonal code multiplexers 830A . . . 830N, a summing unit 840 and a scrambling multiplexer 850. A plurality of ACK/NACKs may be input to the PHICH group modulator 800. Each ACK/NACK may be separately processed via, for example, a series of the repetition unit 810A, the modulator 820A, and the orthogonal code multiplexer 830A. The output of each orthogonal code multiplexer 830A . . . 830N may be summing via the summer unit 840 and multiplexed by scrambling multiplexer 850 using a scrambling code.

The PHICH group modulator 800 may use orthogonal sequences or codes as inputs to each of orthogonal code multiplexers 830A . . . 830N, e.g., to multiplex multiple PHICHs onto the same set of resource elements. For example, any number (e.g., 8 PHICHs) may be transmitted over the same resource element. These PHICHs may be collectively referred to as a PHICH group, and the separate PHICHs within a group may be distinguished using the orthogonal code used during modulation of the PHICH.

Each PHICH group may generate, for example, a total of 12 symbols or a different number of predetermined symbols, which may be sent over any number of resource groups (e.g., 3 resource element groups) that may be spread in frequency, e.g., to ensure good frequency diversity. The cell ID may be used to distinguish the location of this mapping in the frequency range.

Based on the mapping, a PHICH resource (e.g., assigned to or allocated for sending the ACK/NACK to a UE) may be identified by an index pair (e.g., n_group, n_seq), where n_group may be the PHICH group number, and n_seq may be the orthogonal sequence that may be used to distinguish PHICH resources within a group. The amount of resources assigned to the PHICH within a subframe may be determined by the number of PHICH groups and may depend on whether TDD or FDD is used. For FDD, the number of PHICH groups may be fixed in each subframe and may be defined by Equation 1:

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad (1)$$

where $N_g \in \{1/6, 1/2, 1, 2\}$ represents the PHICH-resource parameter in the MIB. For instance, in subframes that may be reserved for the UL, the number of PHICH groups may be zero.

For TDD, the above equation for the number of PHICH groups may be further multiplied by a factor m in each subframe, where m is given by Table 1 below:

TABLE 1

| Uplink-downlink | Subframe number i | | | | | | | | | |
|---|---|---|---|---|---|---|---|---|---|---|
| configuration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

The UL and DL configuration may be set forth by the European Telecommunications Standards Institute (ETSI) in the standard publication "Evolved Universal Terrestrial Radio Access (E-UTRA) Physical layer procedures (3GPP TS 36.213 version 10.0.01 Release 10 (Rel-10) published in January, 2011, the contents of which are incorporated by reference herein.

The PHICH allocations may occur on a per-UE basis, e.g., at the time of the UL grant reception, using Equation 2 for the PHICH resource mapping:

$$n_{PHICH}^{group} = (I_{PRB\_RA} + n_{DMRS}) \bmod N_{PHICH}^{group}$$
$$I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2 N_{SF}^{PHICH} \quad (2)$$

The uplink grant for a subframe may include the PHICH group number and orthogonal sequence number or code for the PHICH assigned to the UE, that may be specified by the lowest PRB index of the UL grant ($I_{PRB\_RA}$) and the cyclic shift that may be used when transmitting the Demodulation Reference Signal (DMRS) to distinguish between different users employing MU-MIMO ($n_{DMRS}$). In terms of the time relationship, the PHICH may be located in subframe n+k, where n is the subframe in which the UL transmission may be made on the PUSCH. For FDD, k may be fixed at a predefined number of subframes (e.g., 4 subframes), whereas in TDD, k may depend on the UL/DL configuration and may be determined by a table lookup, for example.

In Rel-8, the group and sequence index allocation specified by Equation 2 above may be sufficient to guarantee that each UE is assigned a unique PHICH resource for each UL transmission. Since the DMRS value may already be used to distinguish between terminals employing MU-MIMO, it may inherently distinguish between PHICH resources when two terminals may be allocated resources starting at the same PRB on the same subframe.

When CA is allowed, transmissions from UL carriers may be independent and the potential may exist for two terminals to use the same $I_{PRB\_RA}$ and DMRS cyclic shift in the same subframe on a different CC for a UL transmission. Although, the possibility of PHICH collisions may exist, the scheduler may be designed to avoid such collisions. One or more of the following may apply: (1) the PHICH may be transmitted on the same component carrier that was used to transmit the UL grant, which may reduce the number of combinations considered when analyzing the PHICH collisions, e.g., since a given component carrier may be responsible for the PHICH for the terminals in which it transmitted the grant (DCI format 0); (2) the UL heavy configurations, for example, configurations where there are more UL carriers than DL carriers, may not need to be considered; the scheduler may, in theory, allocate sufficient PHICH resources on x DL component carriers used for y UL component carriers when x>=y and when the UL heavy configurations are considered, the number of PHICH resources per UL component carrier may be reduced; (3) the DMRS may be used as a mechanism for avoiding the PHICH collisions that may occur from cross-carrier scheduling (e.g., when the scheduler decides to allocate the same starting PRB to two different terminals in the same subframe, it may ensure that it assigns a different DMRS to each of the terminals); and (4) for semi-persistent scheduling (SPS) which may use a DMRS index of 0, having SPS transmissions occur on the primary component carrier may ensure that no PHICH collisions occur as a result of the SPS.

When a TDD SuppC is added in the DSS bands, it may or may not be equipped with a DL PHY layer control channel (e.g., a PDCCH and/or a PHICH, etc.). Since the DSS bands may be evacuated due to the presence of a primary user (e.g., TVWS) or may be shared with other DSS users, control information may be transmitted on the licensed cells by a system (e.g., LTE system) to aggregate the licensed and DSS bands.

The use of a TDD SuppC may result in an overall configuration of the system that may be UL heavy (e.g., PHICH resources for the UL transmissions on the SuppCells are made over the cells in the licensed band). The introduction of a supplementary TDD carrier, which may not be configured with PHICH resources (e.g., to maintain the PHICH on the licensed band) may cause control issues, e.g., for Rel-10 devices using TVWS, which may be due to additional PHICH resources. For example, an LTE system may lack an appropriate number of PHICH resources on the licensed carrier to aggregate SuppC DSS bands. As the number of supplementary TDD carriers (e.g., using the PHICH provided in the licensed FDD carriers) increases, the PHICH resources on the FDD carrier may be shared by a greater number of UL carriers. PHICH resources may need to be added, e.g., beyond those supplied in Rel-10. This may be due at least in part because of one or more of the following: the power-limited nature of the PHICH; the number of PHICH resources becoming more scarce; and additional strain being placed on the scheduler.

The aggregation of a supplementary TDD carrier with a system operating in the licensed band in FDD mode may require resolving how to use the various PHICH resources efficiently. For example, one or more of the following may apply: the number of PHICH resources used for TDD may change from one subframe to the next based on the TDD UL/DL configuration (e.g., the dependence of the number of PHICH groups on the subframe for TDD), but the number of PHICH groups in an FDD subcarrier may be fixed on a subframe-by-subframe basis; and, the timing of the PHICH association with the corresponding UL transmission in TDD may differ from that given in FDD. Implementations for associating the PHICH resources for a given UL transmission may be disclosed.

Systems, methods, and instrumentalities are disclosed to provide feedback to a user equipment (UE). A UE may transmit uplink data via a supplementary cell. A network device, such as a HeNB, eNB, etc., may receive the uplink data from the UE via the supplementary cell. The network device may send feedback associated with the uplink data to the UE via a physical downlink shared channel (PDSCH) when downlink data is available for transmission to the UE. The feedback may be physical hybrid ARQ indicator channel (PHICH) ACK/NACK information. ACK/NACK information may be referred to as ACK/NACK (e.g., sending ACK/NACK information for an UL transmission may be referred to as sending ACK/NACK for the UL transmission). The feedback sent via the PDSCH may be multiplexed with the downlink data. The network device may send the feedback associated with the uplink data to the UE via a physical downlink control channel (PDCCH) when downlink data is not available for transmission to the UE. The feedback may be sent on one or more of a primary component carrier and a secondary component carrier. The feedback may be sent on a best available licensed cell. The feedback may be sent on a supplementary cell.

The feedback sent via the PDCCH may be sent via a downlink control information (DCI) format on the PDCCH. The DCI format may be format 1C associated with the PDCCH. A modulation and encoding value associated with the DCI format may be used to indicate that the DCI format comprises ACK/NACK information. ACK/NACK information associated with the feedback may be sent in a resource block assignment. The resource block assignment may be a single resource block using a type 2 allocation.

Systems, methods, and instrumentalities may be disclosed for increasing the amount of PHICH resources available, e.g., in an LTE system, that may accommodate a need for additional PHICH resources (e.g., beyond those defined in Rel-10) for sending feedback (e.g., ACK/NACK information) in the DL. Backward compatibility may be included.

Implementations may be disclosed for increasing the amount of PHICH resources available and defined in LTE Rel-10, e.g., to leverage additional resources for sending ACK/NACK for UL transmission on the SuppCs. However, the disclosed systems, methods, and instrumentalities are not limited thereto and may be implemented in other systems.

ACK/NACK may need to be provided for UL transmissions on the SuppC(s). The licensed band carrier (e.g., PCC or SCC) may be used to send the ACK/NACK for the supplementary carrier transmission(s) and additional resources may be defined and leveraged for this purpose. A HeNB may provide a connection for UEs that do not make use of the DSS bands (e.g., and whose operation may be limited to Rel-10).

In addition to an increase in the number of PHICH resources on the licensed CCs in order to satisfy PHICH uses, when SuppCs are introduced, the PHICH resources that may be defined on the SuppCs may be used. These resources may be defined according to Rel-8 PHICH definitions for TDD.

Carrier aggregation of supplementary carriers operating in the DSS bands may be disclosed. However, the disclosed systems, methods, and instrumentalities are not limited thereto. As an illustration, increasing the number of PHICH resources may be used in other scenarios. For example, additional component carriers (e.g., a carrier limited to uplink transmission) may be introduced into a licensed band and may create uplink heavy configurations (e.g., more uplink component carriers than downlink component carriers) and may result in a PHICH shortage with respect to the number of PHICH resources available, e.g., in Rel-10. Implementations such as those disclosed herein may be used to increase the number of PHICH resources to address a PHICH shortage (e.g., the addition of TDD or FDD carriers in the licensed band that may create PHICH resource shortages).

Increasing the number of PHICH resources on the licensed carrier may be disclosed, which may include one or more of the following: creation of additional PHICH resources in the PDCCH of the licensed carrier; creation of a distinct channel on the licensed band for PHICH used by the SuppC; and, multiplexing of the PHICH with data allocations of the data space or resources (e.g., the PDSCH).

PHICH resources for the supplementary carrier may be present on the supplementary carrier, e.g., as disclosed herein.

Implementations may be disclosed where the SuppC may use TDD frame structure and timing. Such implementations may be applied for an FDD SuppC.

Figure 9:
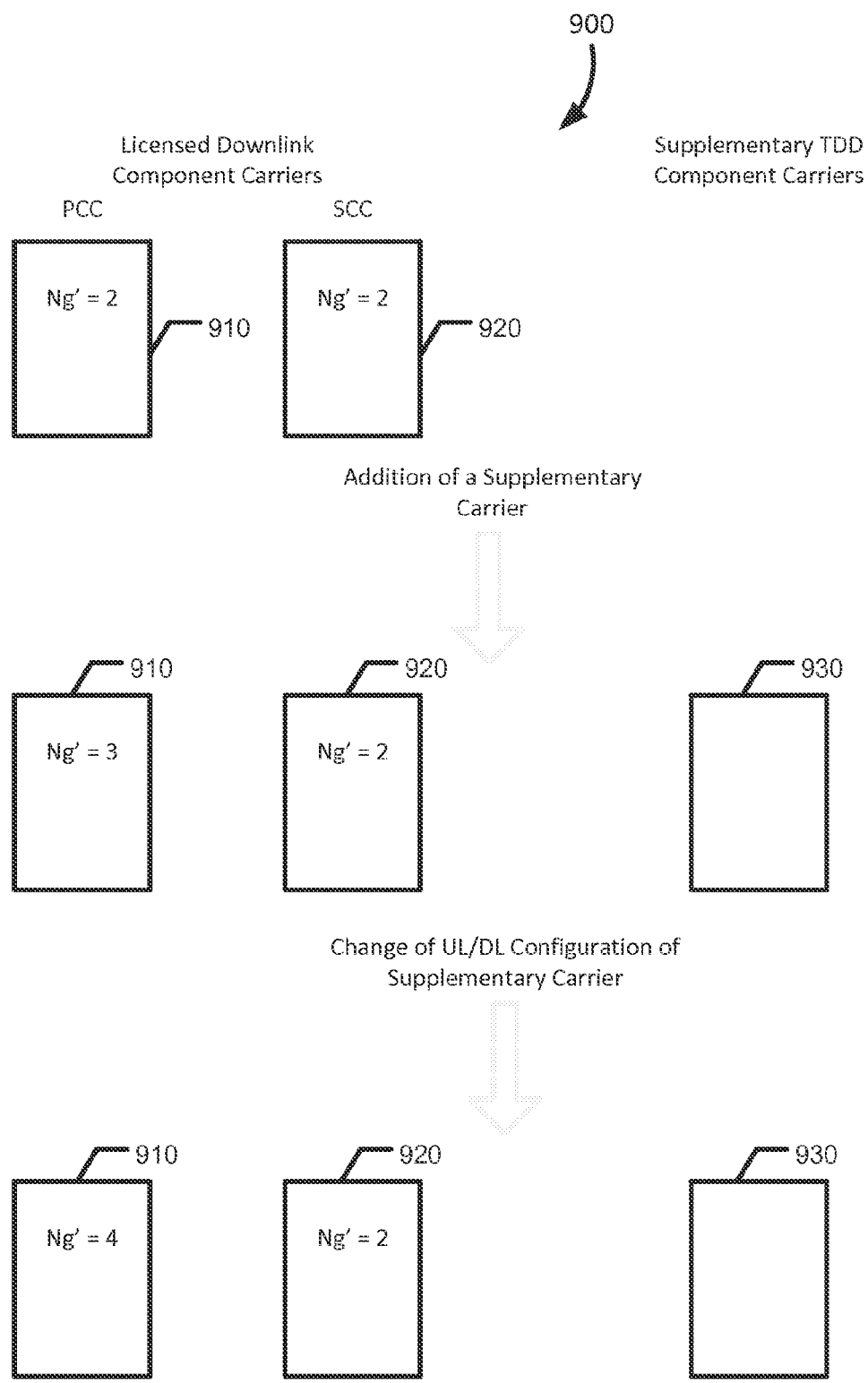
FIG. 9 illustrates an exemplary PHICH resource allocation associated with a supplementary carrier adjustment.

FIG. 9 illustrates an exemplary PHICH resource allocation 900 associated with addition of a supplementary carrier or re-configuration of an existing supplementary carrier. PHICH resource allocation 900 may increase the number of PHICH resources, e.g., by increasing the number of PHICH groups. Rel-10 may include the transmission of a value $N_g$ via the MIB to set the number of PHICH groups for Rel-10 devices. The maximum value for $N_g$ in Rel-10 is 2. Backward compatibility may be lost if this maximum value is increased, e.g., Rel-10 devices may not operate properly. A value $N_g'$ may be implemented for beyond Rel-10 devices that may enable additional PHICH resources to be defined. The value of $N_g'$ may be known by UEs that support the DSS band usage and may not be known by other devices (e.g., which may provide backward compatibility). The value $N_g'$ may not be transmitted in the MIB. The value of Ng' may be sent through an RRC message, e.g., specific to the DSS users. It may also be part of the reconfiguration message, which may add or remove a supplementary carrier, or change the UL/DL configuration.

Since the burden of the PHICH resources used for the UL transmissions on the supplementary TDD carrier may be absorbed by the licensed FDD carrier, $N_g'$ may be increased each time a supplementary TDD carrier is added, or when the supplementary TDD carrier is reconfigured so that the UL subframes in the configuration may be increased. $N_g'$ may be decreased when a supplementary TDD carrier is removed from the aggregation, or the supplementary TDD carrier is reconfigured so that more DL subframes are added in the TDD configuration. Since each of the licensed band CCs (e.g., primary or secondary CCs) may have its own value of $N_g'$, increases in the value of $N_g'$ following supplementary TDD carrier addition or reconfiguration may be applied individually to each licensed band CC and may be at the discretion of the eNB/HeNB.

In FIG. 9, the licensed DL CCs may include primary CC 910 and secondary CC 920. Because the value of $N_g$ (e.g., which may equal 2) in this case may not exceed its maximum value, the procedure may operate in a manner related to Rel-10. $N_g'$ may be detected by beyond Rel-10 devices but additional action may not be taken by the Rel-10 devices. When a supplementary TDD CC 930 is added, $N_g'$ of the primary CC 910 may be increased to 3. Because $N_g'$ may be sent, for example, via RRC messaging, Rel-10 and prior devices may not take action, and beyond-Rel-10 devices may detect $N_g'$ and begin to look for a PHICH group associated with the supplementary CC 930, for example, in the control information region (e.g., symbols 0-2) of each subframe or respective subframes.

When the supplementary TDD CC 930 changes UL/DL configuration such that it is more UL heavy, the $N_g'$ of the primary CC 910 may be increased to 4, e.g., to create one or more additional PHICH groups associated with the supplementary TDD CC 930.

Changes to the UL/DL configuration such that the supplementary TDD CC 930 is less UL heavy may cause the $N_g'$ to decrease removing one or more of the additional PHICH groups associated with the supplementary TDD CC 930.

For backward compatibility, e.g., for Rel-8 and Rel-10 UEs, the PHICH resources created by increasing from $N_g'=2$ to $N_g'=3$ (for instance) may be limited to UEs using the DSS bands (e.g., for ACK/NACK sent on the SuppC). Equation 2 may be modified or may be adapted to differentiate the additional resources defined with $N_g'>2$ to those defined with $N_g'<=2$. For example, this mapping may use a separate value of $N_g$ for UEs that use the DSS bands and may include one or more of the following. In a first case, if $N_g=2$ or less is sufficient to allocate the PHICH resources for the current CA scenario (e.g., including the SuppC), the PHICH mapping may use the Rel-10 procedure to define the PHICH resources for the SuppC or set $N_g'=N_g$. In a second case, if $N_g=2$ is not sufficient, the number of PHICH groups allocated by the eNB/HeNB may be increased by using $N_g'>N_g$ and their location in frequency may be chosen among the remaining Control Channel Elements (CCEs) not used for the PHICH or the PCFICH. In the second case, signaling of $N_g'$ may be limited to UEs that may be capable of using the DSS bands, e.g., using RRC signaling. A mapping may be created, relative to these new resources, for these users. In order for minimal impact of the licensed users (e.g., in terms of CCE blocking), this mapping may ensure that the UE specific search spaces associated with a particular aggregation level may not each be rendered unusable by the presence of the additional PHICH resources. A size limit on the size of $N_g'$ may be set, e.g., so that UEs may not be adversely affected by the mapping. UEs limited to Rel-8 and Rel-10 may use the PHICH resources on the licensed CCs that had been defined with $N_g=2$ or less.

By increasing $N_g'$, the control space or resources available for resource allocations to Rel-8 and Rel-10 UEs may decrease. Due to the impact of increasing $N_g'$ on the availability of search space for legacy LTE and LTE-A users, the values that $N_g'$ may take on, or the algorithm for defining the number of DSS user specific PHICH resources may provide finer granularity of additional PHICH resources than Equation 1. For instance, in Equation 1, an increase by 1 of the value of $N_g'$ may not cause the number of PHICH groups to increase by $N_L^{RB}/8$, but rather by a small number of PHICH groups. $N_g'$ may take on decimal values in Equation 1 (e.g., $N_g'=2.1$). This may allow an increase in the number of PHICH resources available on the licensed band without quickly depleting the PDCCH resources.

Figure 10:
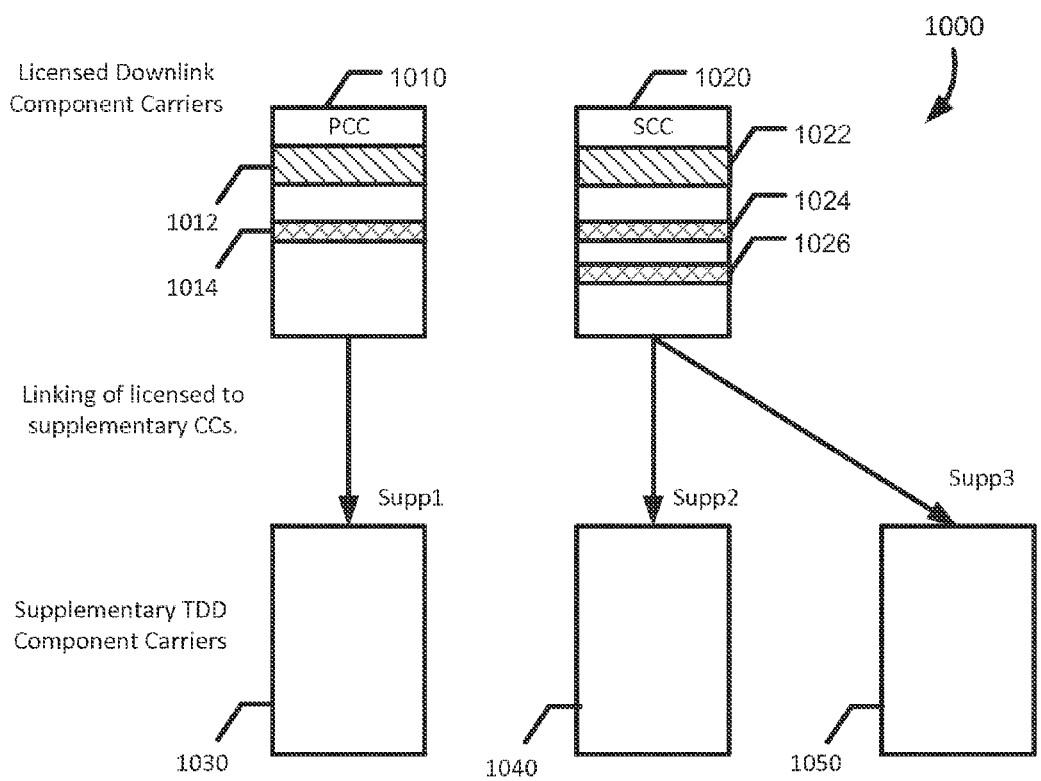
FIG. 10 illustrates another exemplary PHICH resource allocation using linked reserved control channel elements (CCEs)

FIG. 10 illustrates exemplary PHICH resource allocation 1000 using linked reserved control channel elements (CCEs). The PHICH resource allocation 1000 may be enabled using static linking of SuppC 1-3 to reserved CCEs. The number of PHICH resources may be increased by the use of reserved CCEs. For example, CCEs may be reserved for use as PHICH resources. A mechanism for semi-static linking may be used to control the number and/or the size and the location of reserved CCEs that may be created in the PDCCH of each licensed carrier for static linking.

In Rel-8 and Rel-10, each aggregation level in the UE specific search space may have at least 2 and sometime more PDCCH candidates. The reserved CCEs for the supplementary PHICH may be allocated such that a reserved CCE may not impact (e.g., affect) more than one PDCCH candidate per aggregation level (e.g., for L=4 or L=8, etc.). The reserved CCE location for the supplementary PHICH may change in function based on the frame number, e.g., as in the case for the UE specific search spaces. This may allow for the reserved CCEs to be defined (e.g., allocated) without elimination of the UE specific search spaces at a given aggregation level. For instance, for a given UE, the reserved CCEs may eliminate at most one of the UE specific search spaces at aggregation level 8, so that a PDCCH candidate may exist at this aggregation level for this UE. A reservation equation for the reserved CCEs, based on the above, may be developed.

In an illustration, the number of PDCCH candidates for different search spaces aggregation levels and sizes is illustrated in Table 2 for UE Specific and Common types of search spaces. For example, the number of PDCCH candidates may decrease with increasing aggregation level.

TABLE 2

| Search space | | | Number of PDCCH |
|---|---|---|---|
| Type | Aggregation level | Size [in CCEs] | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The number of PHICH resources may be increased dynamically to take into account the variations on the PHICH resource used for a given subframe based on the UL/DL configuration of the TDD SuppC. In such cases, additional PHICH resources may be assigned only to subframes where these are needed. The reserved CCEs may be used for PHICH resources for UL transmissions on the supplementary carrier. Subframe variations of the PHICH resources may follow the UL/DL configuration of the TDD SuppC. For example, a subframe in which an ACK/NACK traditionally cannot be sent in TDD (e.g., because it may be configured as UL) may not have reserved CCEs defined.

An example may be to allocate a plurality of PHICH groups (e.g., 3 PHICH groups) in each reserved CCE. Assignment of the unused reserved CCEs may be inefficient. A minimum level of such assignments may be enabled (e.g., because after assigning a resource element of a given CCE to a PHICH resource, it may not be reassigned to a PDCCH for some operational period, for example, until it can be removed). In order to design the PHICH allocation for a system using SuppCs and making use of reserved CCEs, one or more of the following may be addressed and/or determined: the number of additional PHICH groups that may be introduced (e.g., per subframe, based on the TDD configuration, which may determine the number of CCEs that may be reserved for each subframe, on each licensed band carrier); and, the mapping of the PHICH channels created by the reserved CCEs to each UE based on the UL grant.

By using semi-static linking between licensed carriers and supplementary TDD carriers, regardless of the number of SCCs, each supplementary TDD carrier may be linked to a licensed band carrier (e.g., the PCC or the SCC) and a licensed band carrier may have a link to one or more supplementary TDD carriers. In this way, the reserved CCEs for each licensed carrier may be fixed based on the TDD UL/DL configuration of each of the supplementary TDD carriers that the PCC or the SCC may be linked to. The UE may know which licensed CC may be sending the PHICH, as the UL grants for traffic on the supplementary carrier may be sent by the linked licensed carrier. The PHICH resources may be shown as a conceptual block within the component carrier to demonstrate static linking. The actual size of each Supp PHICH may change on a per-subframe basis to follow the UL/DL configuration of the SuppCs.

In FIG. 10, a primary DL CC or PCC 1010 and a Secondary DL CC or SCC 1020 may be FDD component carriers that may be present in the licensed band. The PCC 1010 may be semi-statically linked to supplementary TDD CC 1030 in the DSS band and the SCC 1020 may be semi-statically linked to two supplementary TDD carriers 1040 and 1050 in the DSS bands. The linking may be established or modified using RRC signaling (e.g., via RRC message) or using MAC CE messages. Responsive to or after the linking is established, the number of PHICH groups created through reserved CCEs may be determined, e.g., based on the linkages. When the UL/DL configuration of one of the supplementary TDD carriers changes, for example the supplementary TDD carrier 1050 does not use any UL resources, the number of PHICH groups in one of the licensed band carriers (e.g., the CCEs 1026 associated with, the PHICH resources allocated to supplementary TDD carrier 1050) based on linking may change (e.g., may be removed or reduced), which may be automatic.

The PCC 1010 may include a PDCCH 1012 for control information including a reserved CCE area 1014 that may be semi-statically linked to the supplementary TTD CC 1030 and the SCC 1020 may include a PDCCH 1022 for control information including a first reserved CCE area 1024 that may be semi-statically linked to the supplementary TTD CC 1040 and a second reserved CCE area 1026 that may be semi-statically linked to the supplementary TTD CC 1050 such that the CCE areas 1014, 1024, and 1026 may be reserved areas used (e.g., exclusively) for linked PHICH resources for ACK/NACKs. The PHICH resources for the ACK/NACK for UL transmission in the licensed bands may be reserved, e.g., based on Rel-8/Rel-10 mechanisms. Since UL heavy configurations in the licensed band may not be allowed, these resources may be sufficient for licensed band UL transmission and the ACK/NACK.

The reserved CCEs may be used in the PCC or SCC for each supplementary carrier linked to a licensed carrier such that a set of reserved CCEs may be associated to each supplementary carrier. The size of that reserved CCE set 1014, 1024 or 1026 may be determined based on the UL/DL configuration and bandwidth of the supplementary TDD carrier 1030, 1040, or 1050 associated with the respective set 1014, 1024, or 1026. When the supplementary carrier (e.g., supplementary carrier 1050) is removed from the aggregation scenario, the associated (e.g., linked) reserved CCE set 1026 may be removed from the corresponding linked licensed band CC.

Linking may be changed, e.g., in order to redistribute the number of reserved CCE sets per licensed band component carrier when supplementary carriers are removed from the aggregation scheme.

Allocation of the SuppC PHICH resources may include one or more of the following. The addition or removal of a reserved CCE and/or linking of a supplementary TDD carrier to a PCC or SCC may be done at the time in which the supplementary TDD carrier is added, removed, or reconfigured. If the addition or activation of a supplementary TDD carrier is done through an RRC message, the RRC message may configure (e.g., for the UEs that may use the supplementary carrier) the linked licensed band carrier (e.g., including the location and/or the size of the reserved CCEs). This may be the case for an activation message or supplementary carrier addition which may be sent by a MAC CE (e.g., the MAC CE may include the linking information and/or the reserved CCE size or location). A reconfiguration of the UL/DL TDD configuration or the supplementary TDD carrier bandwidth may be associated with a change in the reserved CCE configuration.

This procedure may be optimized to reduce the size of the reconfiguration message by having the size and location of the reserved CCEs be tied (e.g., implicitly) to the configured supplementary TDD carrier such that a specific bandwidth and UL/DL configuration for a supplementary TDD carrier may implicitly define, e.g., based on formulas, the location of the reserved CCEs and the size of the CCEs being reserved. The mapping may define the number of CCEs per subframe. The additional PHICH resources used per supplementary TDD carrier may change on a per subframe basis. It may be beneficial to have reserved CCEs removed when a supplementary carrier is deactivated or removed (e.g., it may allow the reserved CCEs to be used as CCEs for PDCCH). The scheduler may treat these reserved CCEs as statically defined (e.g., based on the maximum number of supplementary TDD resources) and use them limited to the case when appropriate based on the number of supplementary TDD carriers present.

Each reserved CCE set may handle the ACK/NACK for UL transmissions on a single supplementary TDD carrier. Equation 1 and Table 1 may be used to determine the number of PHICH groups and/or reserved CCEs in a set on a per subframe basis. This may be accomplished for each reserved CCE set within a CC and may allow the eNB/HeNB to make use of more CCEs for PDCCH during subframes in which PHICH may not be transmitted. Less reserved CCEs may be used. The reserved CCEs may be distributed across the bandwidth of the licensed FDD CC, e.g., in order to ensure frequency diversity.

After a mapping of reserved CCEs, which may include PHICH resource mapping within those reserved CCEs, is established for UEs (e.g., each UE) to follow, equations similar to Equation 2 may be derived to assign PHICH resources to each UE based on the PRB index and the DMRS cyclic shift index provided by the UL grants. The derived equations may make use of the reserved CCEs.

Figure 11:
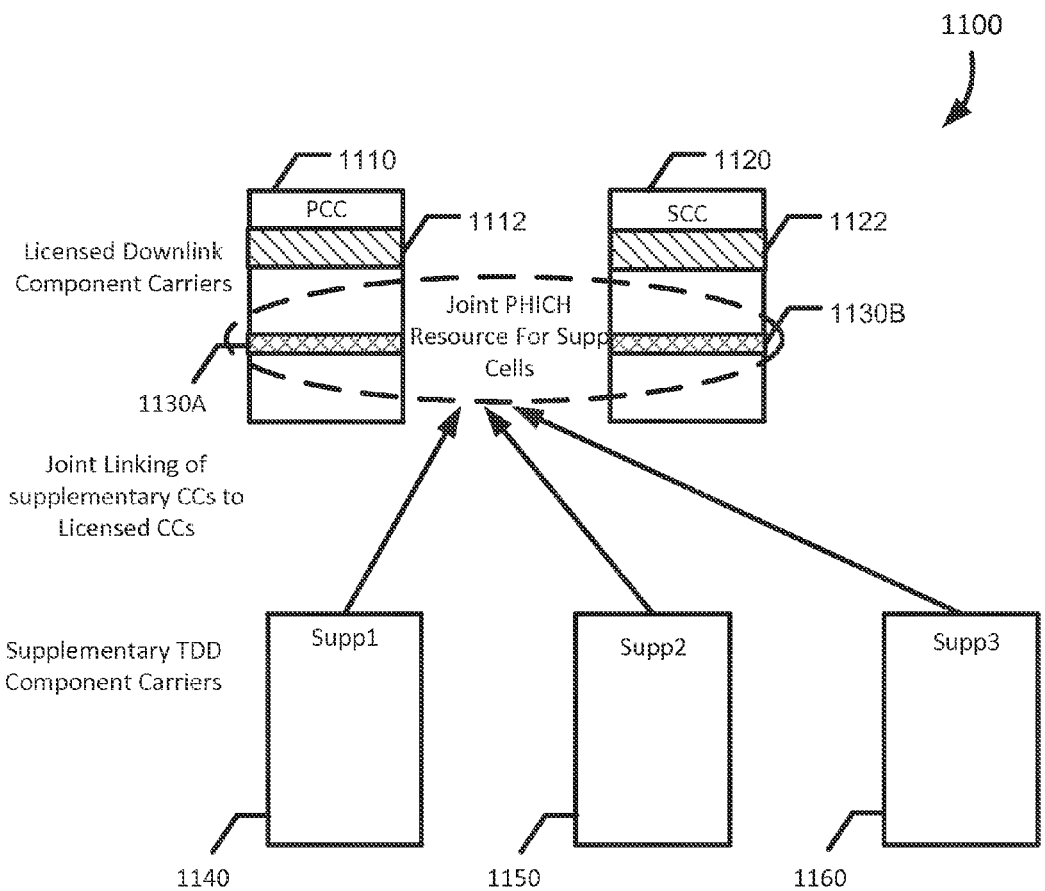
FIG. 11 illustrates a further exemplary PHICH resource allocation using reserved CCEs.

FIG. 11 illustrates an exemplary PHICH resource allocation 1100 using reserved CCEs. A PCC 1110 and a SCC 1120 may be FDD component carriers that may be present in the licensed band. The PCC 1110 and the SCC 1120 may be jointly linked to supplementary TDD CCs 1140, 1150, and 1160 in the DSS bands via reserved CCEs 1130A and 1130B. The reserved CCEs 1130A and 1130B may be pooled and used for the PHICH resources for the supplementary TDD CCs collectively. The joint linking may be established or modified using RRC signaling (e.g., via a RRC message) or using MAC CE messages. Responsive to or after the linking is established, the number of PHICH groups created through reserved CCEs may be determined based on the linkages. When the UL/DL configuration of one of the supplementary TDD carriers changes (e.g., when the supplementary TDD carrier 1050 does not use UL resources), the number of PHICH groups in the licensed band carriers (e.g., the CCEs 1030A and/or 1030B) may change (e.g., may be removed or reduced), which may be automatic.

The PCC 1110 may include a PDCCH 1112 for control information including a reserved CCE area 1130A and the SCC 1120 may include a PDCCH 1122 for control information including a reserved CCE area 1130B. For example, the reserved CCE areas 1130A and 1130B may collectively or jointly be linked to each of the supplementary TDD CCs 1140, 1150, and/or 1160 such that the CCE areas 1130A and 1130B may be reserved areas used (e.g., exclusively) for linked PHICH resources for the ACK/NACKs.

By way of example, reserved CCEs may be used to define the available PHICH resources for Supp Cells as the sum of available PHICH groups across PCC and SCCs, e.g., to maximize trunking efficiencies. If 4 PHICH groups may be available in a Primary Cell and another 4 PHICH groups may be available in Secondary Cell, the total (e.g., collective) number of available PHICH groups as used in Equation 2 (e.g., $N_{PHICH}^{group}$) may be set to 8.

Legacy UEs may be limited to detecting the original Licensed Band PHICH in one of the PDCCH areas 1112 or 1122, for example, of the PCC 1110 or SCC 1120. UEs that may use the DSS bands may detect the PHICH for Licensed Band in one of the PDCCH areas 1112 or 1122 of the PCC 1110 or SCC 1120 and the joint resources for the supplementary TDD cells 1140, 1150, and 1160, e.g., which may be defined through reserved CCEs 1130A and 1130B.

Mapping of the PHICH resources on the licensed band to the UL transmissions on the supplementary carriers may include one or more of the following.

To avoid impacting legacy UEs (e.g., in terms of availability of PHICH resources) and to keep the scheduler complexity to a minimum, the joint PHICH resources for the supplementary TDD cells 1140, 1150, and 1160 may be used by the DSS UE when they are performing UL transmissions on the DSS bands. When UL transmissions are performed by the DSS UEs on the licensed bands, they may employ the PHICH resources for Licensed Bands (e.g., in the PDCCH 1112 or 1122), e.g., using rules related to Rel-10.

The reserved CCEs which make up the Joint PHICH resources for the Supplementary TDD Cells 1140, 1150, and 1160 may be defined continuously across the licensed carrier 1110 and 1120 (e.g. using a single index that may take on values 0 to $i_1$ on the PCC and values $i_1+1$ to $i_2$ on the SCC). This may provide an equal trunking efficiency. UL allocations that may be made for the supplementary TDD carrier 1140, 1150 and 1160 (e.g., whether scheduled from PDCCH on the supplementary carrier or from PDCCH on the licensed carrier) may use the one of the reserved CCEs 1130A or 1130B based on an assigned index, e.g., regardless of where the UL grant has been made from. The index for the reserved CCE 1130A or 1130B to be used by a UE for a UL grant may be made implicitly from the starting PRB index of the allocation and the DMRS. The assignment of the CCEs may be a function of the UE ID and the DMRS, e.g., to provide a better trunking efficiency and not have the PHICH tied to the allocation (e.g., such allocations on different supplementary carriers may likely have similar starting UL PRBs). Different cyclic shifts assigned to each UE through the DMRS may be leveraged in order to differentiate between UEs that may be assigned the same reserved CCE (e.g., due to them having the same starting PRB for their UL allocation on different supplementary carriers, or having cell IDs that have a modulo relationship to each other based on the number of reserved CCEs).

An explicit mapping of reserved CCEs to UEs may be used to tie the reserved CCEs to each UE. This may use some signaling, which may be sent through RRC messaging, or in the DCI format 0 or 4 that may be used to send the UL grant.

Figure 12:
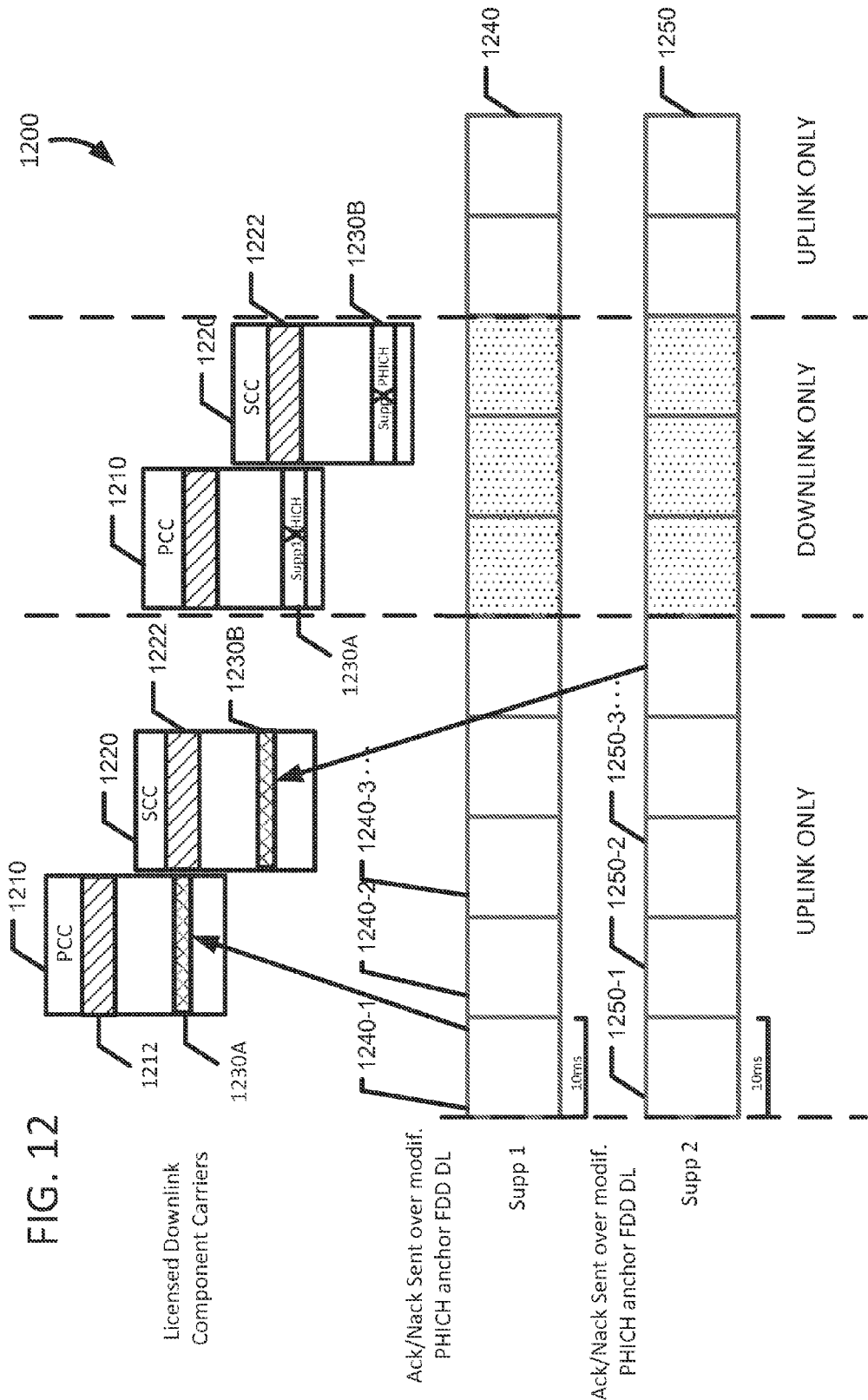
FIG. 12 illustrates an exemplary dynamic allocation of PHICH resources.

FIG. 12 illustrates an exemplary dynamic allocation 1200 of PHICH resources. The dynamic allocation 1200 may include a PCC 1210 and a SCC 1220, which may be FDD component carriers that may be present in the licensed band. The PCC 1210 and the SCC 1220 may link to supplementary FDD CCs or SuppCells 1240 and 1250 in the DSS band via reserved CCEs 1230A and 1230B. The reserved CCEs 1230A and 1230B may be statically linked or pooled and used for the PHICH resources for the supplementary FDD CCs 1240 and 1250. The linking may be established or modified using RRC signaling (e.g., via RRC messages) or using MAC CE messages.

The PCC 1210 may include a PDCCH 1212 for control information including the reserved CCE area 1230A and the SCC 1220 may include a PDCCH 1222 for control information including the reserved CCE area 1230B.

In dynamic FDD, the SuppCells may operate as a cell limited to DL or as a cell limited to UL. When the SuppCell operates in the DL, no ACK/NACK feedback in the DL may be required and no PHICH resources or a minimum set of PHICH resources may be allocated for Supp Cells 1240 and 1250, as illustrated by the X mark at the CCEs 1230A and 1230B for the DL mode period. When the SuppCells 1240 and 1250 operate in the UL mode period, ACK/NACK feedback may be provided. The SuppCell (e.g., being UL) may report the ACK/NACK feedback on another carrier (e.g., SuppCell 1240 may report the ACK/NACK feedback on the PCC 1210 and Supp Cell 1250 may report the ACK/NACK feedback on the SCC 1220.

The Supp Cell reconfiguration command may indicate information or a flag regarding changes of PHICH resources (e.g., the SuppCell 1240 changing from UL mode to DL mode or vice-versa). The switch in operating modes may be pre-configured in advance and the transition time (e.g., transition delay time) may be indicated. In this case, a transition from UL mode to DL mode may signal (e.g., implicitly) to the UE that the Supp PHICH resources may be removed (e.g., to free up the CCE reserved resources for example 1230A or 1230B). The delay may be in the range of 2 to 8 subframes and may be 4 subframes after the UL-to-DL transition, as shown in the FIG. 12. For a DL-to-UL transition, the previously allocated PHICH resources may be reallocated as in the previous cycle.

Figure 13:
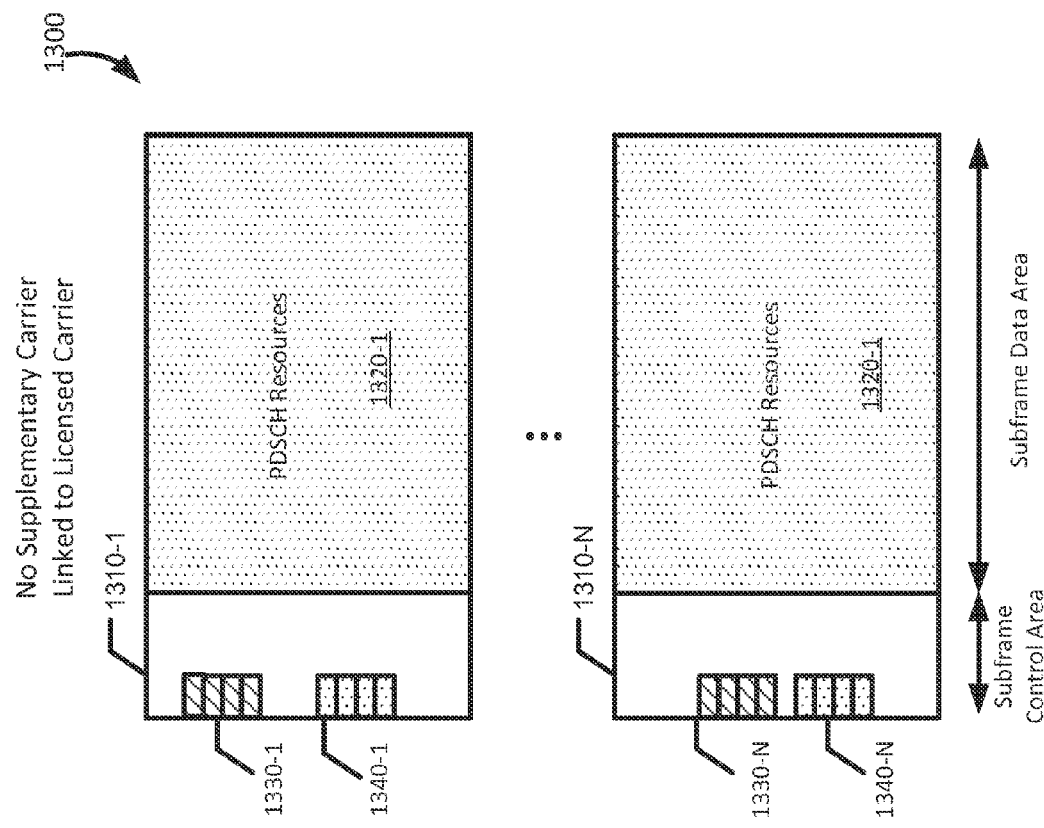
FIGS. 13, 14 and 15 illustrate exemplary allocation of PHICH resources of one of the component carriers.
Figure 14:
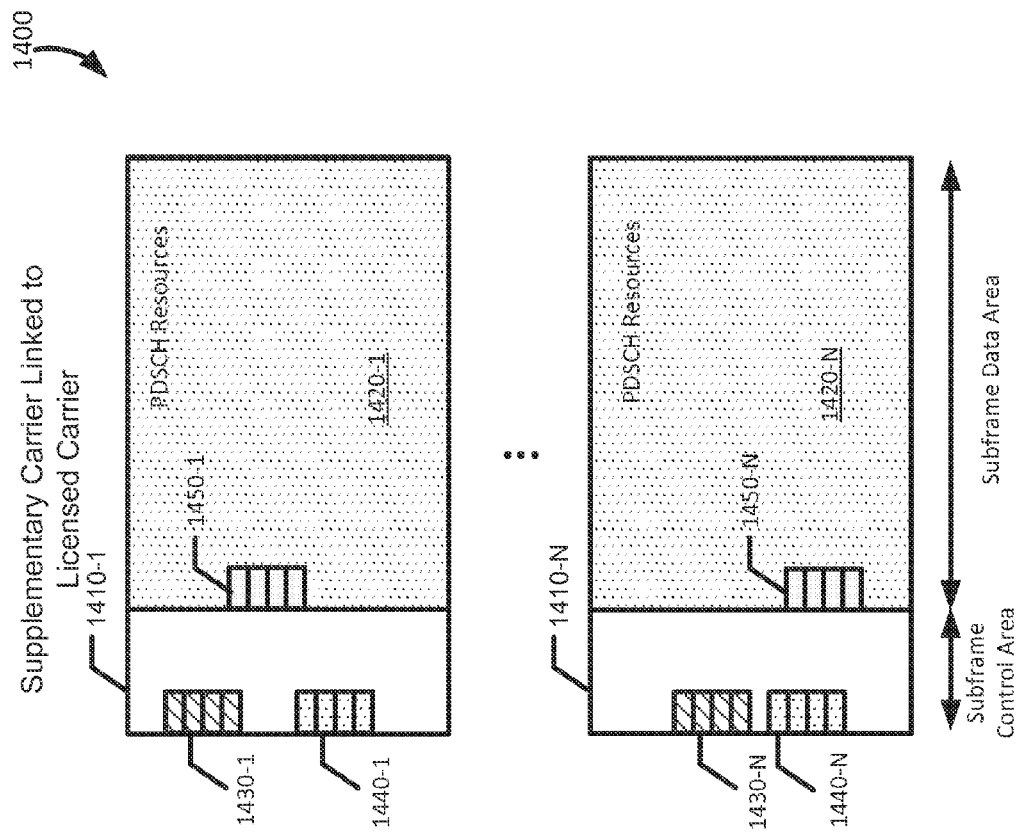
Figure 15:
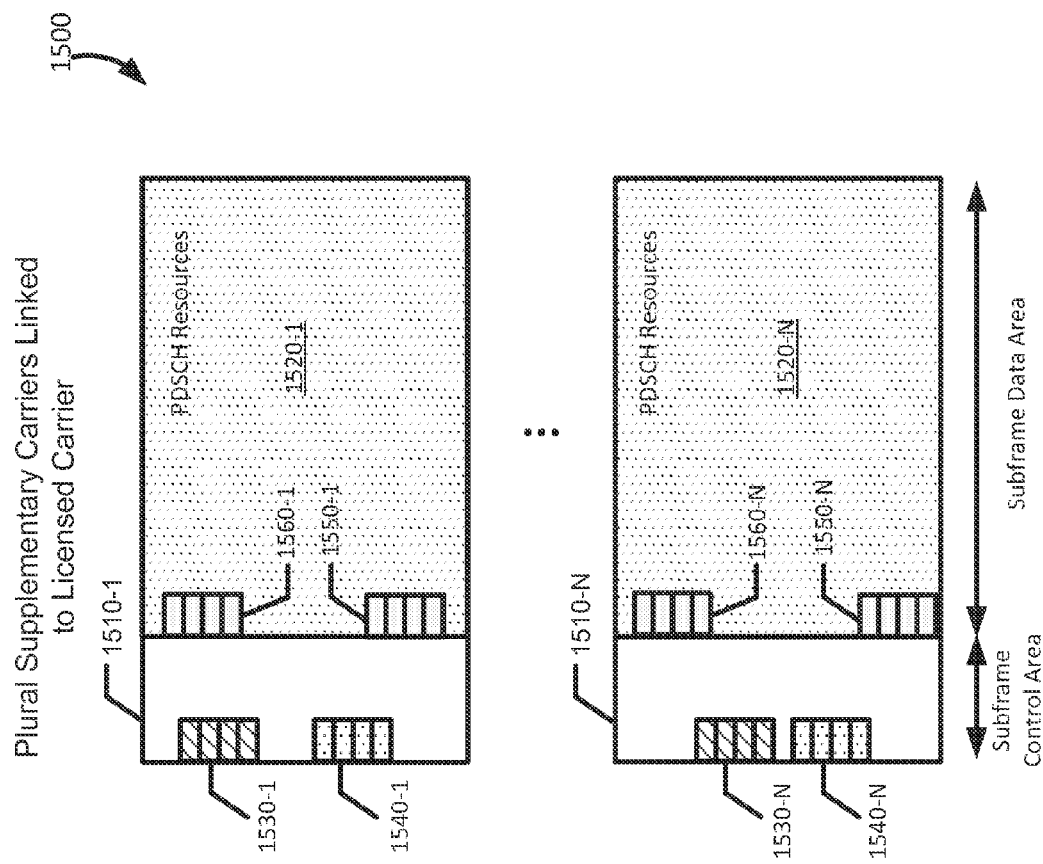

FIGS. 13, 14 and 15 illustrate exemplary allocation 1300 of PHICH resources of one of the component carriers. FIG. 13 illustrates a first configuration 1300 of a licensed band (e.g. the Primary Cell or the Secondary Cell) in which no supplementary carrier (e.g., TDD or FDD) is linked to the licensed carrier. FIG. 14 illustrates a second configuration 1400 of a licensed band (e.g. the Primary Cell or the Secondary Cell) in which a supplementary carrier (e.g., TDD or FDD) is linked to the licensed carrier. FIG. 15 illustrates a third configuration 1500 of a licensed band (e.g. the Primary Cell or the Secondary Cell) in which two supplementary carriers (e.g., TDD and/or FDD) are linked to the licensed carrier. In FIGS. 13-15, each subframe 1 . . . N may include one or more of the following: a subframe control area or PDCCH 1310-1 . . . 1310-N; 1410-1 . . . 1410-N; or 1510-1 . . . 1510-N; or a subframe data area or PDSCH 1320-1 . . . 1320-N; 1420-1 . . . 1420-N; or 1520-1 . . . 1520-N. The PDCCH of each subframe 1-N may include a Physical Control Format Indicator Chanel (PCFICH) 1330-1 . . . 1330-N; 1430-1 . . . 1430-N; or 1530-1 . . . 1530-N and the PHICH 1340-1 . . . 1340-N; 1440-1 . . . 1440-N; or 1540-1 . . . 1540-N for the licensed band. The PDSCH of each subframe 1-N may include one or more PHICHs according to the number of linked supplementary carriers (e.g. TDD and/or FDD carriers). For example, subframe 1 of FIG. 13 may have no PHICH in the PDSCH 1320-1, subframe 1 of FIG. 14 may have a PHICH 1450-1 in the PDSCH 1420-1 and subframe 1 of FIG. 15 may have two PHICHs 1550-1 and 1560-1 in the PDSCH 1520-1. The PHICH in the PDSCH may be located at or near the beginning of the PDSCH (e.g., at or near the fourth symbol), for example, to reduce power drain of the UEs or other devices. For plural PHICH 1550 and 1560, the PHICH 1550 and 1560 may be spaced apart in a specified or predetermined location.

A PHICH for the SuppCell in a channel 1450, 1550, or 1560 may be defined within the PDSCH 1420 and 1520 of the licensed band. The presence of this channel 1450, 1550, or 1560 may be known by UEs that may be aware of the supplementary carrier. The knowledge may be limited to such UEs. The resource elements 1450-1 . . . 1450-N, 1550-1 . . . 1550-N, or 1560-1 . . . 1560-N, which may be used for the additional PHICH resources may not be part of the resource elements allocated by the eNB/HeNB within the PDSCH 1420 and 1520. This procedure may enable (e.g., maintain) backward compatibility for UEs that use the licensed band (e.g., use may be limited to the licensed bands) because PDSCH allocations may not include resource elements reserved for the supplementary carrier PHICH. Although the channel (e.g., which may be created) is shown as located in the PDSCH, it may be located in the control portion (e.g., the PDCCH) of each subframe or a combination of the PDSCH and PHICH.

The number of PHICH groups assigned may depend on the number of supplementary carriers being aggregated and the UL/DL configuration of each of these carriers. As a supplementary TDD carrier is added, removed, or reconfigured, the allocation of PHICH within the PDSCH area may increase or decrease accordingly.

The location of the PHICH resources within a given OFDM symbol may follow the distribution defined in Rel-8 for LTE, e.g., to obtain frequency diversity for the PHICH resources and to ensure that the PHICH resources are scaled per subframe based on the TDD UL/DL configuration. For a given supplementary carrier configuration, the eNB/HeNB may first reserve the resource elements in the PDSCH area which may be used for the PHICH. Actual PDSCH allocations for both UEs, which are using the supplementary TDD carrier and those functioning in Rel-10 mode, may then be made with the remaining resources.

The resource allocation of the licensed FDD DL carrier with: no SuppCell is illustrated in FIG. 13; 1 SuppCell is illustrated in FIG. 14; and 2 SuppCells is illustrated in FIG. 15. The PCFICH 1330, 1430, and 1530 may indicate a PDCCH 1310, 1410, and 1510 (e.g., on the licensed band) that may include control symbols (e.g., the first three OFDM symbols 0, 1, and 2). The PHICH for the supplementary TDD carrier may be assigned from the beginning of the PDSCH 1320, 1420 or 1520 (e.g., the fourth OFDM symbol) and may spread across the frequency spectrum, e.g., as may be accomplished with the PHICH in Rel-8. These PHICH resources may be used for the supplementary TDD carrier. The amount of resources may change on a subframe-by-subframe basis, e.g., depending on the UL/DL configuration. Equation 1 and Table 1 may be used to determine the number of PHICH groups within each symbol. The joint or semi-static linking (e.g., as disclosed herein) may be used to adjust the number of PHICH groups defined within the PDSCH of the licensed band on a per carrier basis. For example, the PHICH resources may be limited to the primary CC. They may increase each time a new supplementary TDD carrier is added or they may exist on the PCC and on one or more SCCs. This may depend on the number of supplementary TDD carriers being aggregated, and may be changed by RRC signaling.

The number of PHICH groups, for example, in the fourth OFDM symbol of a given licensed band CC may be establish from Equation 3:

$$N_{PHICH\_supp}^{group} = m \cdot n_{supp} \cdot |N_{g\_supp}(N_{RB}^{DL}/8)| \quad (3)$$

where: the $N_g$ parameter may be changed for a parameter that reflects the number of PHICH groups in the PDSCH area for that licensed band carrier; and additional multiplication factors may be added for the subframe number (e.g., based on Table 1) and the number of supplementary carriers linked to the particular licensed band carrier. These parameters, as with the $N_g$ parameter, may be signaled using the SI. The MIB signaling may be used for $N_g$, e.g., Rel-8/Rel-10 systems may have knowledge of $N_g$ before they start to decode the PDCCH. $N_{g\_supp}$ and $n_{supp}$ may be defined by RRC signaling, e.g., at the time when the supplementary carrier is added. This may ensure that the DSS carriers may determine the appropriate resources for the PHICH within the data area, e.g., when it is to be used.

The OFDM symbol, which may follow the PDCCH area, may be used for the PHICH for the supplementary carrier. A UE, which is expecting the ACK/NACK, may obtain the PHICH from the licensed band more quickly if the ACK/NACK is located in the initial symbol or beginning portion of the symbols. It may then turn off the front-end for the remainder of the subframe if there is no data allocated to it. If the amount of the PHICH to be allocated for the supplementary carrier increases, subsequent OFDM symbols may be used.

Although shown in FIGS. 13-15 as sets of 4 consecutive resource elements (e.g., as in Rel-10), the arrangement of the resource elements used for the PHICH may be any number of resources elements.

The allocation may include one or more of the following. For a Rel-8 and/or Rel-10 UE, the PHICH resource allocation may follow Rel-8 or Rel-10. When a UE that may use the DSS bands is granted an UL allocation from a PCC or SCC for resources on the SuppC, the PHICH, which may include the ACK/NACK for the UL transmissions on the SuppC, may be located, for example, in the fourth OFDM symbol of the licensed carrier that may have sent the UL grant. After completion, the location of the PHICH resource for the UE may be given by the initial PRB and the DMRS cyclic shift value, e.g., Rel-8, and the total number of PHICH resources defined on the fourth OFDM symbol may be given by Equation 3. The value of parameters used to define the location of these resources (e.g., m and Ng) may be sent with the initial configuration of the supplementary carrier before the UE may start to communicate in the DSS bands. The remainder of resource blocks assigned for the PHICH in procedure 3 may be unusable by Rel-8 and/or Rel-10 UEs. When the scheduler has one or more transport blocks to be sent to a UE using the DSS bands in the same subframe as the PHICH, it may use the remainder of the resource blocks used for assigning PHICH (e.g., as disclosed above) to send this data. This may be indicated by a resource allocation on the PDCCH, e.g., Rel-8 and/or Rel-10. When a UE receives a DL allocation that may include resource blocks used as described above, the UE may remove the PHICH from, for example, the OFDM symbol 4 prior to decoding a remainder of the resource block for data.

Figure 16:
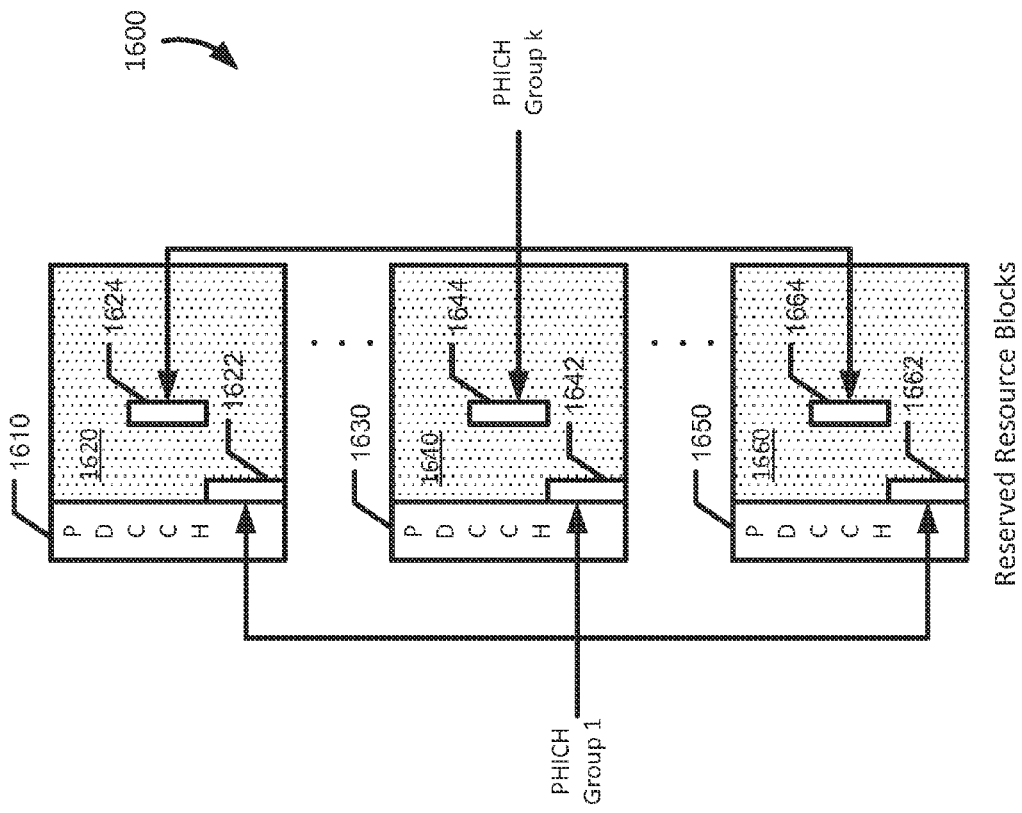
FIG. 16 illustrates an exemplary mapping of PHICH to reserved resource blocks of a cell.

FIG. 16 illustrates an exemplary mapping 1600 of PHICH 1622 and 1624; 1642 and 1644; and/or 1662 and 1664 to reserved resource blocks of a cell (e.g., mapping for the PHICH using reserved resource blocks on the PDSCH of the Primary Cell or Secondary Cell. A new channel within the PDSCH region of the licensed band carriers may be created and may include the reservation of one or more resource blocks for using additional PHICH resources.

The same of a similar linking (e.g., joint linking or semi-static linking used for CCEs) may be used for reserved resource blocks, except that the additional PHICH 1622 and 1624, 1642 and 1644, and/or 1662 and 1664, for the supplementary carrier may be found in reserved resource blocks, e.g., instead of reserved CCEs. Two or more resource blocks may be used and may be separated in the frequency domain, e.g., to ensure some degree of frequency diversity for the PHICH. An individual PHICH group k may occupy multiple resource blocks to benefit from frequency diversity.

For example, a set of n resource blocks may be equally separated in frequency domain, and their location may be defined through the cell ID (e.g., to avoid interference between or among the additional PHICH resources transmitted by, for example, separate eNBs/HeNBs). Linking may be used such that, for example, each supplementary carrier may expect (e.g., search for) its PHICH resources on the PCC or a specific SCC based on the established linking. Each PHICH may be multiplexed over the n resource blocks, and the PHICH groups may be defined by assigning a different combination of carriers and OFDM symbols within the resource block.

The presence of a PHICH 1622 and 1624, 1642 and 1644, and/or 1662 and 1664, in a reserved resource block 1610, 1620, or 1630 on a specific subframe may depend on the subframe number and the specific UL/DL configuration of the SuppC. FIG. 16 shows an example in which 3 resource blocks 1610, 1620, and 1630 may be reserved for the PHICH resources for the supplementary TDD cell(s) and in which 12 symbols from a specific PHICH may be multiplexed over the three resource blocks. For example, in the case of a system using normal CP and a PDCCH of length 3, 33 PHICH groups may be defined (e.g., 264 PHICH resources are contemplated if DMRS cyclic shifted).

The actual location of the Physical Resource Block (PRB) used for the PHICH may be changed on a subframe basis according to a predefined hopping pattern, e.g., in order to ensure frequency diversity.

Certain subframes may be equipped with reserved resource blocks, e.g., in order to exploit the nature of the TDD subcarrier, and to avoid having reserved resource blocks on each subframe. Table 2 or a similar mapping may be used to define which subframes may include these reserved resource blocks based on the UL/DL configuration. By changing the HARQ timing of the supplementary TDD carrier, e.g., compared to the definition in Rel-8, the number of subframes including reserved resource blocks may be reduced (e.g., further) by allocating the PHICH for the ACK/NACK in response to UL transmissions of different subframes to the same reserved resource block.

Figure 17:
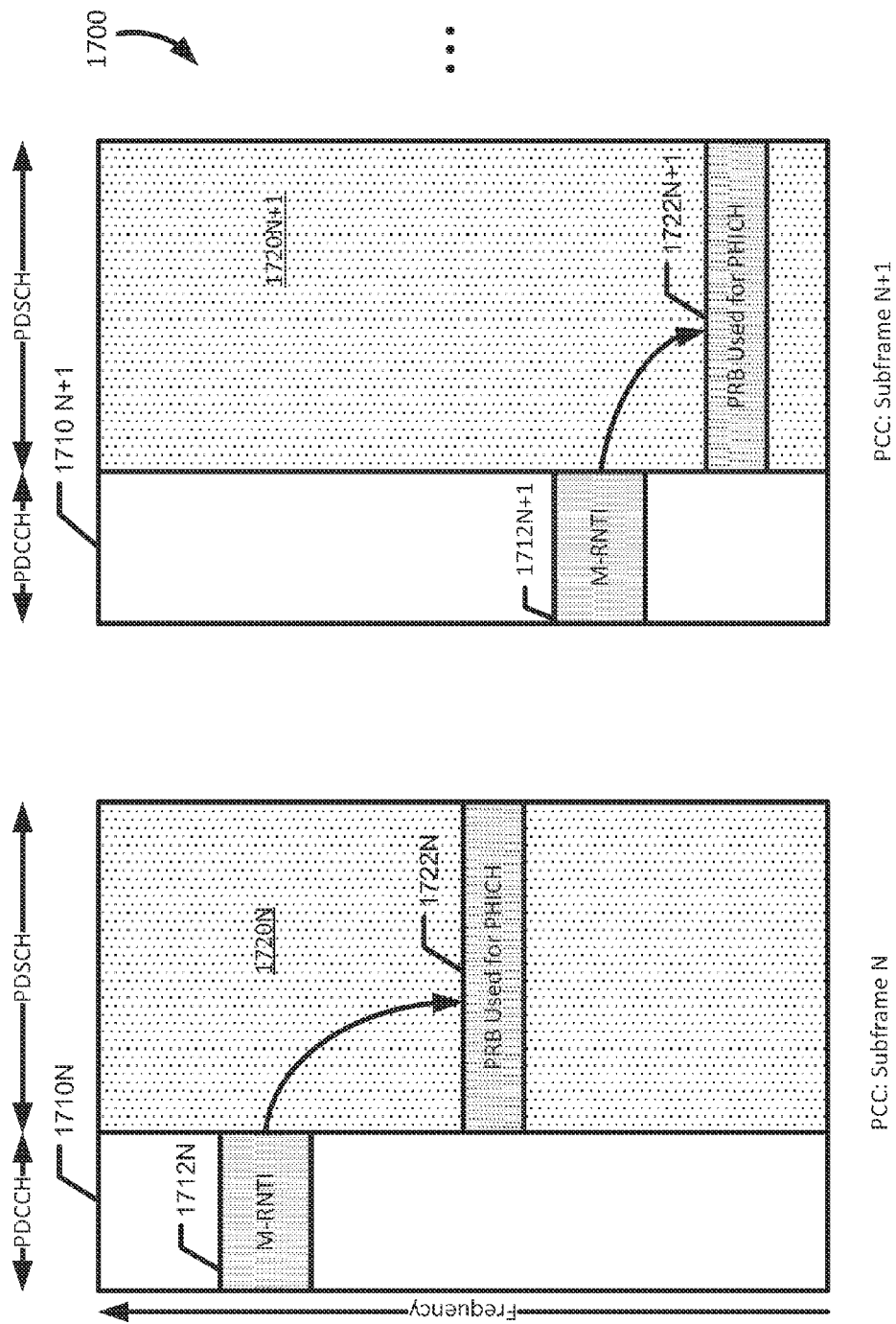
FIG. 17 illustrates an exemplary allocation based PHICH resource definition.

FIG. 17 illustrates an exemplary allocation 1700 based PHICH resource definition. The PDCCH 1710N or 1710N+1 may indicate the presence of a reserved resource block 1722N or 1722BN+1 through an allocation (e.g., a created allocation) made to a subset of UEs. A Radio Network Temporary Identifier (RNTI) 1712N or 1712N+1 (e.g., a multicast RNTI) may be created, e.g., to define the set of UEs that have access to the supplementary carriers and to the additional PHICH resources that may be carried in the reserved resource blocks on the data space or resources. In each subframe N and N+1 . . . where the reserved resource blocks 1722N or 1722N+1 for the PHICH may be provided, an allocation on the PDCCH 1710N or 1710N+1 may be provided using the multicast RNTI 1712N or 1712N+1. Each UE may locate the PHICH resource destined to it within this allocated resource block, e.g., in order to obtain the ACK/NACK it may receive. If a UE is not expecting an ACK/NACK on the PHICH on a given subframe N or N+1, it may ignore the allocation that may be made on that particular subframe.

Such an allocation may allow the eNB to dynamically change frequency location of the resource block that is dedicated for the PHICH based on the channel conditions, e.g., which may ensure that PHICH may be allocated a resource block that has relatively good channel conditions for the UEs to receive it. The number of PHICH resources may be changed on a subframe basis (e.g., if the eNB/HeNB determines that PHICH resources beyond what is currently in the PDCCH space are not needed, this allocation may not be made for one or more subframes). For example, the M-RNTI 1712N may indicate a particular location and/or size of the PHICH 1722N in subframe N and the M-RNTI 1712N+1 may indicate a particular location and/or size of the PHICH 1722N+1 in subframe N+1. The M-RNTI may selectively be included in the PDCCH, e.g., to provide the addition PHICH in a subframe, for example, subframe N or N+1.

The PHICH resources may be distributed in a predetermined pattern (e.g., evenly across the data space or resources, periodically across the data space or resources, in a particular region of the data space or resources, etc.). This may be an alternative to allocation. For even distribution of the PHICH resources, the PHICH resources may occupy a small percentage (e.g., below a threshold percentage) of the resource elements of each resource block. The UEs may be able to decode the assigned resource blocks successfully, e.g., with small degradation, because a small percentage of resource blocks may be modified in order to add the distributed PHICH data.

Figure 18:
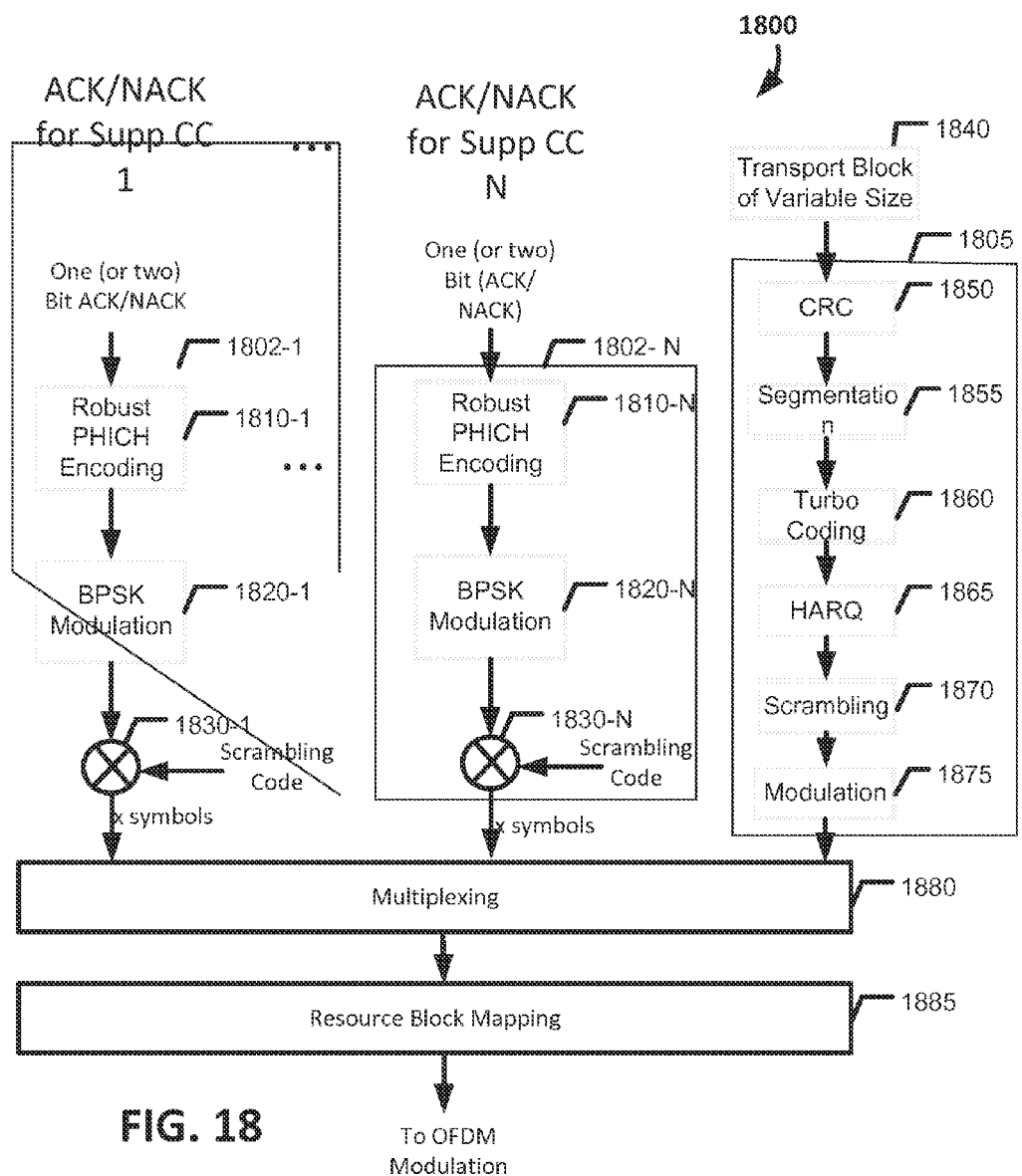
FIG. 18 illustrates an exemplary ACK/NACK multiplexing operation.

A multiplexing operation may be used to send ACK/NACK information with actual data allocations (e.g., ACK/NACK multiplexed with data), for example, as described below. FIG. 18 illustrates an exemplary ACK/NACK multiplexing operation using an ACK/NACK modulator 1800. The ACK/NACK modulator 1800 may include a plurality of ACK/NACK chains or processor unit 1802-1 ... 1802-N, each may respectively include, for example, an encoder 1810-1, 1810-N (e.g., a robust PHICH encoder), a modulator 1820-1 ... 1820-N (e.g., a BPSK, QPSK or other modulator), and/or a multiplexer 1830-1 ... 1830-N that may use a scrambling code. Each processor unit 1802-1 ... 1802-N may output a predetermined number of symbols that may be input to a multiplexer 1880. A transport block (e.g., variable sized) may be input to transport block processing unit 1805 including a CRC unit 1850, a segmentor unit 1855, a turbo coding unit 1860, a HARQ unit 1865, a scrambling unit 1870, and/or a modulation unit 1875. The output of the transport block processing unit may be input to the multiplexer 1880 to multiplex the data output from the transport block processing unit 1805, e.g., with a predetermined number of symbols from each of the processing units 1802-1 ... 1802-N. The out of the multiplexer 1880 may be input to a resource block mapper (RBM) that may map the resource blocks prior to OFDM modulation. The resource blocks may be mapped according to predetermined rules and algorithms, e.g., Rel-10. Although the ACK/NACK modulator 1800 may be shown with separate processing units, any number of such units or a single unit may be used.

The robust PHICH encoding may include an n-bit repetition, where n may be larger than a threshold number (e.g., larger than 3 which may be used for PHICH encoding in the PDCCH). The value n may be predetermined or may be dynamically set based on the channel quality (e.g., signaling by the eNB, for example, via RRC signaling). When the channel quality of the component carrier that is carrying the multiplexed PHICH changes, the value n may be adjusted. For example, when the channel quality degrades, the value n may be increased and when the channel quality improves the value n may be decreased, e.g., to maintain a BER, or other channel quality indicator, for the PHICH at or below a threshold value. In lieu of or in addition to the RRC signaling of channel quality, the value n may be selected based on or derived from the CQI reported by the UE, which may receive the transport block comprising the embedded PHICH. For a low quality channel with a low CQI, the value n may be set larger (e.g., the eNB and UE may be aware of this based on the CQI reported by the UE). Convolutional encoding may be employed to implement the robust PHICH encoding, where the code rate may be set higher than the code rate of the PDCCH channel.

For example, the ACK/NACK multiplexing operation may include the ACK/NACKs for each Supplementary CC (SuppCC) being separately processed for multiplexing onto the data space or resources. The PHICH for the SuppCC may be sent using the PDSCH allocations made to the UE for DL data on the licensed band (e.g., the PCC or the SCC). The ACK/NACK for UL data of the SuppCC may be multiplexed on or piggybacked with DL data intended for the same UE on the PCC and/or SCC. This may not affect the data region of, and may be backward compatible with, Rel-8 and Rel-10 UEs.

The eNB/HeNB may multiplex the data for a transport block to be sent to a UE with the ACK/NACK destined for that UE. The ACK/NACK of each SuppCC may be encoded, e.g., using a separate chain or series as shown in FIG. 18.

A similar circuit for demodulating the ACK/NACK of FIG. 18 may be implemented using the reverse operations to those described regarding FIG. 18. For example, a processor may be configured to perform one or more of the following: unmap resource blocks of the data space or resources; demultiplex the unmapped resource blocks of the data space or resources; or individually decode the confirmation transmission and the data of the data space or resources. The encoded confirmation transmission may have a higher decoding reliability than the encoded data of the data space or resources to regenerate the ACK/NACKs inputted to ACK/NACK modulator 1800.

The ACK/NACK for UL transmissions on different supplementary TDD carriers may be bundled on a single ACK/NACK. This may result in a single chain (e.g., and may use a single processing unit).

Due to the more stringent BER used for PHICH compared with the PDSCH data, a more robust encoding for the PHICH in conjunction with, for example BPSK modulation may be used. The encoding used for PHICH may be more robust than 3-bit repetition, e.g., Rel-8 PHICH.

Since data and ACK/NACKs may have different coding, scrambling, and/or modulation, the multiplexing, for example at multiplexer 1880, of the data and the ACK/NACKs may be accomplished following each process. The resource elements that may carry the ACK/NACK may be reserved for a specific UE; no multiplication by an orthogonal code may be used. This may eliminate multiple PHICH being transmitted on a single PHICH group and may maintain the same number of PHICH resources, e.g., regardless of whether MU-MIMO may be used.

The multiplexing operation, e.g., by the multiplexer 1880, may perform time and frequency multiplexing of the PHICH with the remainder of the transport block prior to mapping to the resource blocks, e.g., as may be the case with UCI on the PUSCH. The PDSCH allocation may take into account the additional resource elements used for the ACK/NACK. The mapping of transport block size (e.g., given some resources reserved for the ACK/NACK) may be used by UEs with DSS capability (e.g., limited to use by the UEs with DSS capability), which may provide backward compatibility of Rel-8 and Rel-10 UEs. Each DSS-capable UE may know during which subframe it may expect an ACK/NACK from the eNB/HeNB; this information may be used by the UE to trigger de-multiplexing in order to separate ACK/NACKs (e.g., for each SuppCell that may transmit one of the ACK/NACKs) from the transport block, e.g., and may use the mapping for the effective transport block size. A single standard mapping (e.g., to resource elements) of the symbols associated with the ACK/NACK may be used and may depend on the number of Supplementary CCs from which the UE simultaneously expects an ACK in addition to the number of ACK/NACK bits coming from each supplementary carrier (e.g., 2 bits for an UL-MIMO). This information may be made available to each UE via RRC signaling.

The component carrier that carries the ACK/NACK (multiplexed with the data) may correspond to the one which had been used to send the UL allocation on the supplementary carrier. The specific licensed carrier that may include the ACK/NACK may be determined using previous Release rules.

Given the robustness of the PHICH, PHICH resources associated with supplementary cells may be piggybacked on the primary cell resource allocations. This may be restrictive when secondary cells may be present because it may reduce the probability that a PHICH may be piggybacked on a given subframe and may increase the frequency of occurrence of fallback mechanisms, e.g., as disclosed herein. The PHICH may be piggybacked on a best available licensed cell (e.g., first primary, then secondary) that includes a data allocation for the particular UE.

Symbols associated with the PHICH across the transport block may be distributed, e.g., to provide robustness to frequency selective fading. The mapping may be dependent on the allocation type (e.g., type 0, type 1, and/or type 2), and/or the number of resource blocks assigned.

One or more fallback mechanisms may be used. For example, when no data is allocated for a UE on a target subframe, a fallback mechanism may be used. When no data is available for a particular UE on a given subframe and the eNB/HeNB may need to send an ACK/NACK for an UL transmission on the supplementary carrier, a fallback may be used, e.g., using the PDCCH. In such a case, the ACK/NACK may be sent through a DCI format on the PDCCH, which may not allocate resource blocks in PDSCH, but may send the symbols (e.g., 12 symbols) for the ACK/NACK to the specific UE. The sending may be limited to 12 symbols. For example, PDCCH format 1C may be used to send the ACK/NACK, e.g., this DCI format may be small and may already be used for special communication such as sending information for MCCH change notification. A predefined value of the modulation and coding scheme may be used to flag (e.g., indicate) the format to be a DCI format 1C that includes the ACK/NACK. The corresponding ACK/NACK symbols may be sent in the place of the resource block assignment. The ACK/NACK may be sent in a single resource block allocation to the UE (e.g., using allocation type 2), which may allow no change in the existing DCI formats.

PHICH multiplexing with data may include one or more of the following. The UE may expect that an ACK/NACK for an UL transmission on the SuppC be made in subframe n to be sent by the eNB/HeNB on frame n+k. The value of k may be fixed (e.g., as in FDD) or may be based on the TDD UL/DL configuration. RRC signaling may specify which timing is to be used. If the scheduler has data to be sent to the particular UE in subframe n+k, the scheduler may multiplex the data with the ACK/NACK. If the scheduler does not have data to be sent to the particular UE in subframe n+k, the scheduler may send the ACK/NACK using the predefined DCI format (e.g. DCI format 1C). The UE, in subframe n+k, may determine the location of the ACK/NACK based on the received DCI. If the predefined DCI format is addressed to the UE, the UE may use the DCI itself to find the ACK/NACK information. If the UE receives an allocation DCI format, the UE may demultiplex the ACK/NACK from the resource blocks, e.g., prior to transport block decoding.

ACK/NACK multiplexing may be used for the ACK/NACK associated with UL transmission limited to the supplementary carrier (e.g., in order to promote backward compatibility). The above may be extended to UL transmission on the licensed carriers, which may for example eliminate the need for a PHICH altogether. The ACK/NACK may be multiplexed with the data over the supplementary carrier, e.g., rather than the PCC or SCC.

The DSS bands may be less reliable. It may be less desirable to locate the PHICH on these bands. There may be scenarios in which the PHICH may be more reliable when located on the DSS bands. For instance, the SuppC may be located on a band that may be leased from or brokered to a specific operator and the operator may have some guarantee of the quality of the SuppC. In this case, some or all of the ACK/NACKs for UL transmissions may be sent on the supplementary TDD carrier. The UL grant for the transmission on the Supplementary TDD carrier may be sent on the licensed carrier or on the supplementary carrier, e.g., depending on various criteria as described herein. The licensed carrier may be used for ACK/NACK for UL transmissions that occur in the licensed band. The licensed carrier may be used for one or more ACK/NACK corresponding to UL transmissions from the supplementary TDD carrier.

If the PHICH resources on a TDD carrier are sufficient for sending the ACK/NACK for UL PUSCH transmissions for that carrier and if the PHICH resources on the licensed band are sufficient for UL transmissions on the licensed band, a total number of PHICH resources available (e.g., when the TDD supplementary carrier PHICH resources are pooled with the licensed band PHICH resources) may be sufficient for a configuration of secondary and supplementary carriers. PHICH resources may be assigned to avoid collisions.

Figure 19:
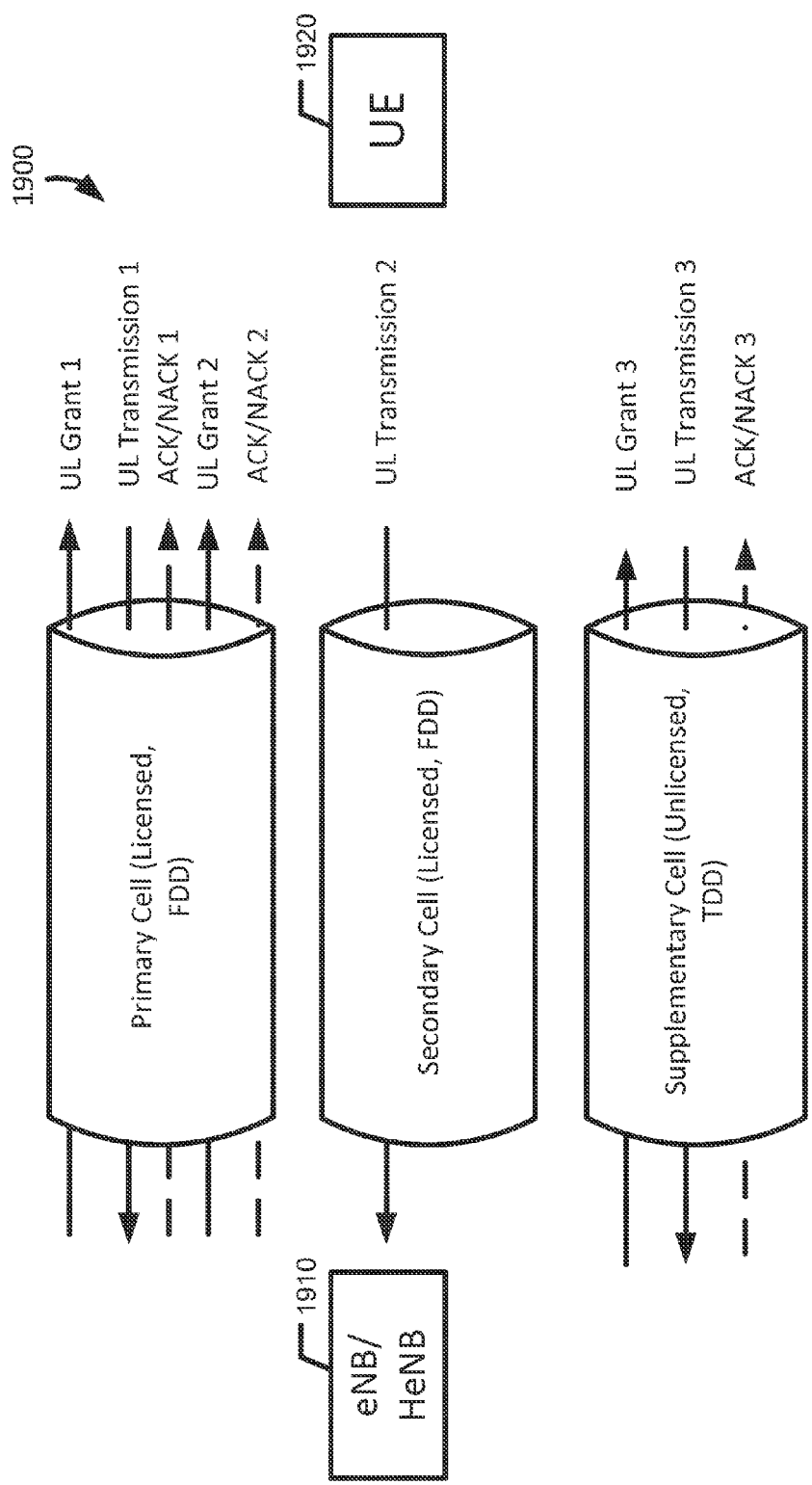
FIG. 19 illustrates an exemplary supplementary cell uplink (UL) grant operation.

FIG. 19 illustrates an exemplary supplementary cell uplink (UL) grant operation 1900. An UL grant 1 may be provided from the eNB/HeNB 1910 over the PrimCC (e.g., the primary licensed FDD carrier component). The UL grant 1 may indicate that UL transmission 1 by the UE 1920 is to be sent over the PrimCC. The UE 1920 may send a UL transmission 1 over the PrimCC to the eNB/HeNB 1910. During the UL grant, the MIB may be sent from the eNB/HeNB 1910 to the UE 1920 and may specify, for example, the location including the CC (e.g., the PrimCC) used to transmit the ACK/NACK 1 and/or the size of the PHICH resources for the ACK/NACK 1 that is to be associated with the UL transmission 1 by the UE 1920.

After UL grant 1, an UL grant 2 may be provided from the eNB/HeNB 1910 over the PrimCC. The UL grant 2 may indicate that the UL transmission 2 by the UE 1920 is to be sent over the secondary CC. The UE 1920 may send the UL transmission 2 over the secondary CC to the eNB/HeNB 1910. During the UL grant 2, the MIB may be sent from the eNB/HeNB 1910 to the UE 1920 and may specify, for example, the location including the CC (e.g., the PrimCC) used to transmit the ACK/NACK 2 and/or the size of the PHICH resources for the ACK/NACK 2 that is to be associated with the UL transmission 2 by the UE 1920.

An UL grant 3 may be provided from the eNB/HeNB 1910 over the Supplementary TDD CC. The UL grant 3 may indicate that the UL transmission 3 by the UE 1920 is to be sent over the Supplementary TDD CC. The UE 1920 may send the UL transmission 3 over the Supplementary TDD CC to the eNB/HeNB 1910. During the UL grant 3, the MIB may be sent from the eNB/HeNB 1910 to the UE 1920 and may specify, for example, the location including the CC (e.g., the Secondary CC) used to transmit the ACK/NACK (e.g., ACK/NACK 3 and/or the size of the PHICH resources for the ACK/NACK 3 that is to be associated with the UL transmission 3 by the UE 1920).

Figure 20:
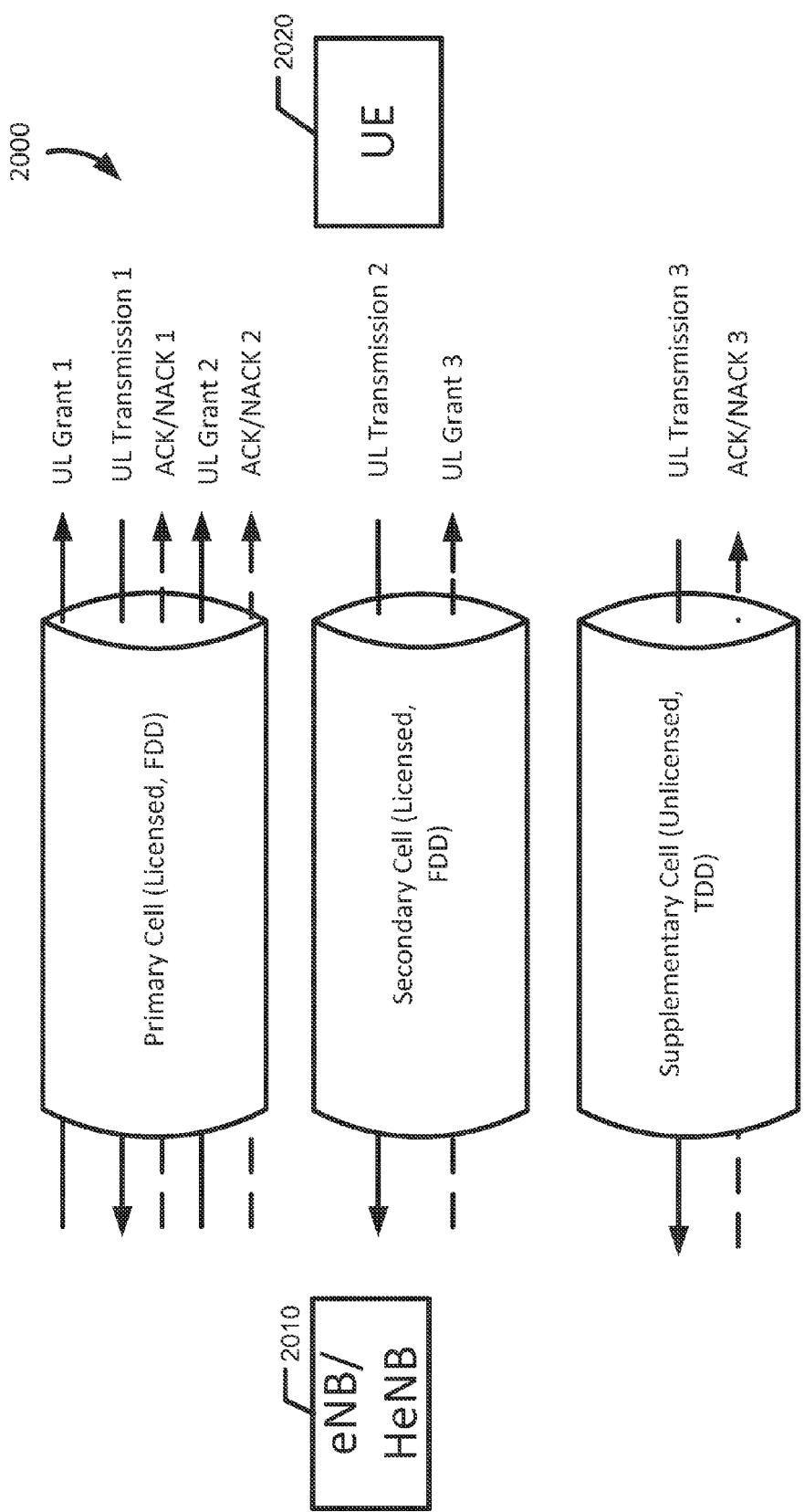
FIG. 20 illustrates an exemplary supplementary ACK/NACK UL transmission.

FIG. 20 illustrates an exemplary supplementary ACK/NACK UL transmission 2000. An UL grant 1 may be provided from the eNB/HeNB 2010 over the PrimCC (e.g., the primary licensed FDD carrier component). The UL grant 1 may indicate that UL transmission 1 by the UE 2020 is to be sent over the PrimCC. The UE 2020 may send the UL transmission 1 over the PrimCC to the eNB/HeNB 2010. During the UL grant, the MIB may be sent from the eNB/HeNB to the UE 2020 and may specify, for example, the location including the CC (e.g., the PrimCC) used to transmit the ACK/NACK 1 and/or the size of the PHICH resources for the ACK/NACK 1 that is to be associated with the UL transmission 1 by the UE 2020.

After UL grant 1, an UL grant 2 may be provided from the eNB/HeNB 2010 over the PrimCC. The UL grant 2 may indicate that UL transmission 2 by the UE 2020 is to be sent over the secondary CC. The UE 2020 may send UL transmission 2 over the secondary CC to the eNB/HeNB 2010. During the UL grant 2, the MIB may be sent from the eNB/HeNB 2010 to the UE 2020 and may specify, for example, the location of the CC (e.g., the PrimCC) used to transmit the ACK/NACK 2 and/or the size of the PHICH resources for the ACK/NACK 2 that is to be associated with the UL transmission 2 by the UE 2020.

An UL grant 3 may be provided from the eNB/HeNB 2010 over the Secondary CC. The UL grant 3 may indicate that UL transmission 3 by the UE 2020 is to be sent over the Supplementary TDD CC. The UE 2020 may send a UL transmission 3 over the Supplementary TDD CC to the eNB/HeNB 2010. During or subsequent to the UL grant 3, RRC signaling may be sent from the eNB/HeNB 2010 to the UE 2020 and may specify, for example, the location including the CC (e.g., the Supplementary TDD CC) used to transmit the ACK/NACK (e.g. the ACK/NACK 3 and/or the size of the PHICH resources for the ACK/NACK 3 that is to be associated with the UL transmission 3 by the UE 2020). The UE 2020 may be a beyond Rel-10 or a DSS UE, e.g., because the ACK/NACK 3 was not on the same CC as its corresponding UL grant 3.

The scheduler may be restricted to not employ cross-carrier scheduling for the UL. The UL grants may be scheduled from the cell (e.g., primary, secondary, or supplementary) where the PUSCH transmission may occur, and the ACK/NACK for that transmission may be sent on the same cell. Cross carrier scheduling may be used (e.g., limited to use) for the licensed band.

The UL grants made for PUSCH transmission on the supplementary cell may be accomplished via the PDCCH on the same supplementary cell; the ACK/NACKs for these transmissions use (e.g., may be limited to using) the resources on the supplementary cell and may be collision-free. The timing of the expected ACK/NACK may be derived, for example, from Rel-8 specific to the carrier (e.g., TDD or FDD), where the scheduling has been accomplished such that additional signaling may not be needed for determining the ACK/NACK timing.

The scheduler may specify (e.g., along with each UL grant) the component carrier on which the ACK/NACK may be received, which may allow flexibility for cross-carrier scheduling and the PHICH location. The scheduler may have the ability to perform cross carrier scheduling from the licensed band for the UL associated with the DSS band and may eliminate the uses for the PDCCH on the supplementary TDD carrier. The scheduler may have the flexibility of using the pool of PHICH resources (e.g., licensed and supplementary) on a dynamic basis. Collision avoidance may be achieved using an extra degree of freedom, for example, a third degree of freedom. For example, one or more of the following may apply: the eNB/HeNB may schedule different UEs by specifying a different starting PRB; if the same starting PRB is scheduled between different UEs, a different cyclic shift may be assigned for the DMRS; or if assigning a different cyclic shift is not possible due to the number of user involved in UL-MIMO, the PHICH resources to be used by the two UEs may be taken from different carriers.

A field may be added to the UL grant DCI format (e.g., DCI format 0), which may specify the CC used for PHICH signaling. For each SuppCell configured, the upper layer may indicate (e.g., via RRC messaging or signaling) which DL CC the upper layer is to receive the PHICH, which may spread the load in the control space or resources, e.g., if multiple UEs assigned to a given PrimCell are active at the same time.

The timing of the ACK/NACK relative to the UL using prior rules for TDD or FDD may cause problems due to scheduling for DSS UEs in which the PUSCH transmission is over the licensed (FDD) carrier, and the PHICH on the supplementary TDD carrier may be used to send ACK/NACK to the DSS UE. In such a case, the supplementary TDD carrier may not have a subframe configured for DL at the subframe when it is to send the ACK/NACK. This may be removed from the scheduling scenarios used by the scheduler or a rule may be enforced such as scheduling the ACK/NACK on the next available DL subframe.

The UEs allowing for DSS operation may follow different rules for UL grants made for supplementary carriers and licensed band carriers, e.g., which may avoid specification of the location of the PHICH and may maintain backward compatibility. For UL transmissions made on the licensed band as well as for Rel-10 UEs, the UL grant as provided for in Rel-10 may apply (e.g., the PHICH for the UL transmission may be located on the CC where the grant was sent). For UL transmissions made on the supplementary carrier, the PHICH may be sent on the same supplementary carrier as the UL transmission. This may provide backward compatibility and collision avoidance. For example, UL heavy configurations may not occur given the PHICH resources on the supplementary TDD carrier may be employed. The PDCCH may or may not be transmitted on the supplementary TDD carrier.

By sending PHICH on the TDD supplementary carrier, the PHICH resources on a TDD carrier may have already been defined that automatically scale these resources based on the UL/DL configuration and/or the subframe number. The supplementary carrier may not have the reliability level to provide for the PHICH (e.g., a Bit Error Rate at or above a threshold level). One or more of the following may apply: as long as the system evaluates the supplementary carrier to be reliable (e.g. no other users detected or good quality measurements for BER, SNR, and/or SIR, etc.), the supplementary carrier may be used to send the PHICH; or when the supplementary carrier quality drops below a threshold (e.g., pre-established or specified for which the supplementary carrier may be good enough to send data but not the ACK/NACKs), the number of PHICH resources on the licensed FDD carrier may be dynamically increased, e.g., to send ACK/NACKs on the licensed band. One or more of the following may be used for the above. During initial system configuration or initial configuration of the supplementary carrier, the UE and eNB/HeNB may perform measurements of the supplementary carrier. If the quality of this carrier for a particular UE is above a certain threshold, the PHICH may be configured on the supplementary carrier (e.g., the Rel-8 TDD mechanism for PHICH allocation may be used). If the quality is at or below the threshold, one of the PHICH extension mechanisms (e.g., as disclosed herein) may be used. The decision and the PHICH configuration may be sent to the UE using RRC signaling.

The UE may continue to monitor the quality of the supplementary carrier in comparison to the threshold. If a change is detected (e.g., the quality goes from being above the threshold to below the threshold, or vice versa), the eNB/HeNB may change the mechanism in which PHICH is configured. This change may be communicated to the UE through RRC signaling.

Although different mechanism have been illustrated for enabling ACK/NACK resource allocations to enable the use of supplementary CCs, each mechanism may be an operational mode for accomplishing such allocations and the system may selectively choose between or among (e.g., two or more) of the various modes based on operational conditions including measured channel interference, UE power supply capacity, and the existence of Rel-8 and Rel-10 devices on the primary, secondary, and/or supplementary CCs, among others.

Figure 21:
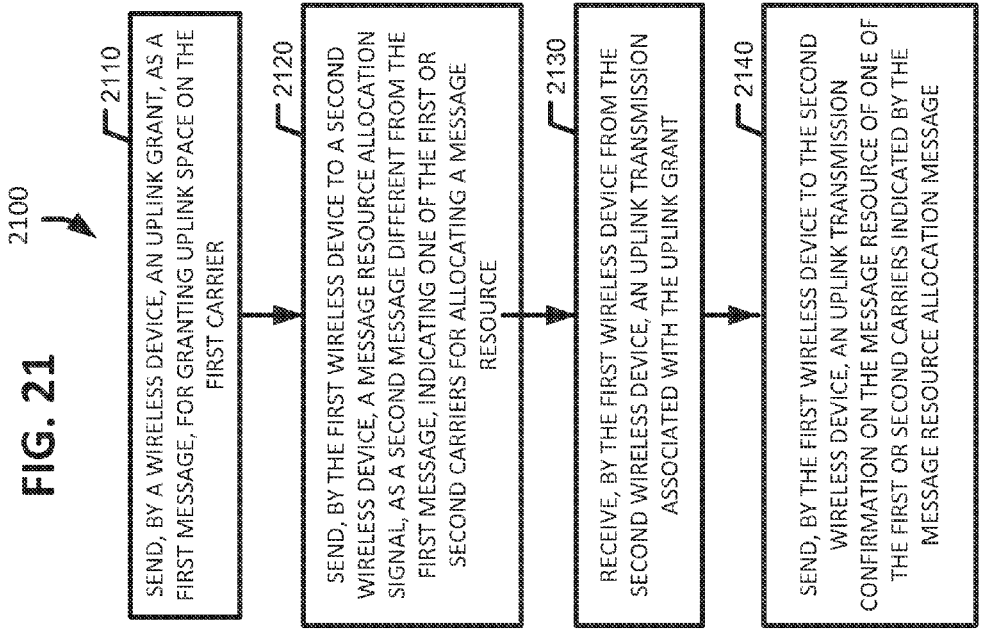
FIG. 21 illustrates exemplary allocation of messaging resources.

FIG. 21 illustrates an exemplary mechanism 2100 of allocating message resources between or among first and second carriers in a wireless communication network. The method may include one or more of the following. At 2110, a first wireless device (e.g., the base station, gateway, eNB or HeNB, etc.) may send an uplink grant, for example as a first message, for granting uplink space or resources on the first carrier. At 2120, the first wireless device may send to a second wireless device (e.g., a UE, wireless radio, computer, notebook, and/or WRTU, etc.) a message resource allocation signal, as a second message different from the first message, indicating one of the first or second carriers for allocating a message resource.

For example, the sending of the message resource allocation signal may include the first wireless device sending information in the message resource allocation signal indicating an allocation flag, which may establish one or more of the following: there may be confirmation transmission resources in the data space or resources of one of the first or second carriers; there may be a confirmation transmission resource channel in the data space or resources of one of the first or second carriers; or multiplexing of the confirmation transmission with data of the data space or resources of one of the first or second carriers. The allocation flag may be sent responsive to the message resources for confirmation transmission not being sufficient to handle confirmation transmissions associated with the carriers used to communicate between the first and second wireless devices.

Figure 22:
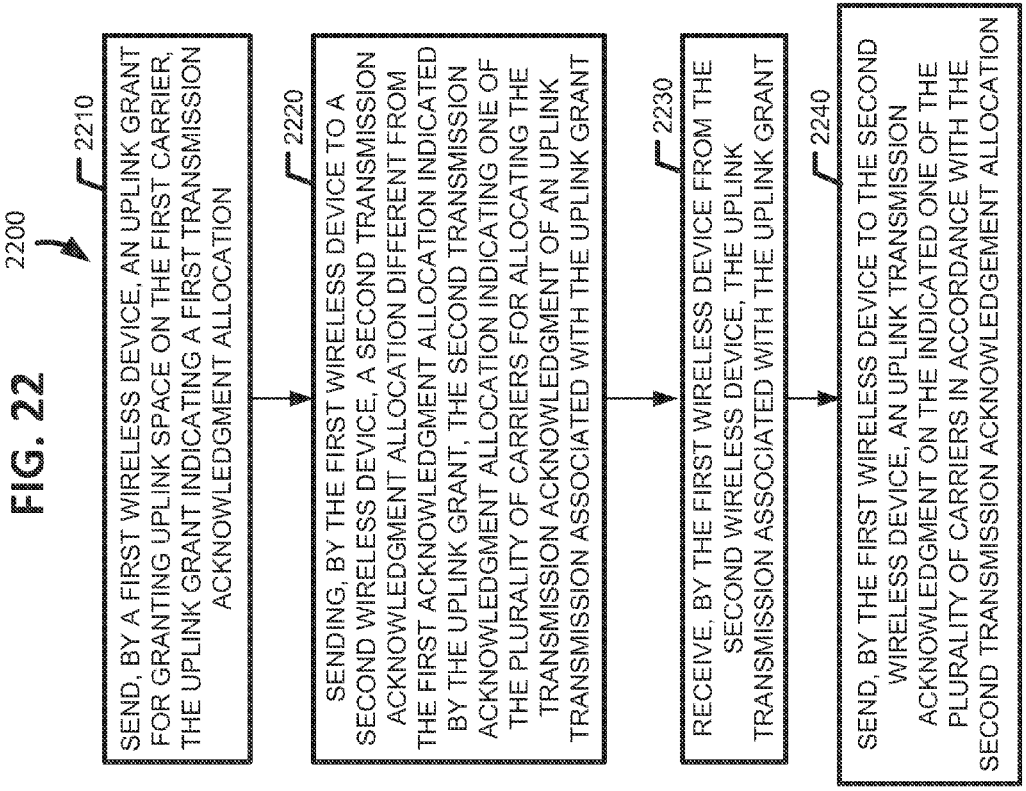
FIG. 22 illustrates exemplary allocation of messaging resources.

FIG. 22 illustrates an exemplary mechanism 2200 of allocating message resources between or among a plurality of carriers in a wireless communication network. In FIG. 22, 2200 may include, at 2210, a first wireless device (e.g., the base station, gateway, eNB or HeNB, etc.) that may send an uplink grant for granting uplink space or resources on the first carrier. The uplink grant may indicate a first transmission acknowledgment allocation. At 2220, the first wireless device may send to a second wireless device (e.g., a UE, wireless radio, computer, notebook, and/or WRTU, etc.) a second transmission acknowledgment allocation, which may be different from the first acknowledgment allocation indicated by the uplink grant. The second transmission acknowledgment allocation may indicate one of the plurality carriers for allocating the transmission acknowledgment of an uplink transmission associated with the uplink grant. At 2230, the first wireless device may receive from the second wireless device, the uplink transmission associated with the uplink grant. At 2240, the first wireless device may send to the second wireless device an uplink transmission acknowledgment on the indicated one of the plurality of carriers in accordance with the second transmission acknowledgement allocation. The second wireless device may function in a complementary fashion to the first wireless device such that they as paired or matched receivers/transmitters.

The multiplexing of the confirmation transmission with the data of the data space or resources may include individually encoding the confirmation transmission and the data in the data space or resources (e.g., the encoded confirmation transmission may have a higher decoding reliability than the encoded data of the data space or resources); multiplexing the encoded confirmation transmission with the encoded data, e.g., as a multiplexed result; and/or mapping the multiplexed result to resource blocks in the data space or resources.

The confirmation transmission resource channel may be located in a beginning region of the data space or resources of one or more subframes.

The processor may adjust the value of the allocation flag based on a number of supplementary carriers used to communicate between the first and second wireless devices and may determine the sufficiency to handle the confirmation transmissions based on the adjusted value of the allocation flag.

At 2130, the first wireless device may receive from the second wireless device, an uplink transmission associated with the uplink grant. At 2140, the first wireless device may send to the second wireless device, an uplink transmission confirmation on the message resource of one of the first or second carriers indicated by the message resource allocation signal.

A processor of the first wireless device may determine which one of the first or second carriers may carry the transmission confirmation based on at least one characteristic of the first or second carriers (e.g., whether the first and/or second carrier is licensed or in the DSS bands, and/or whether they have sufficient PHICH resources, etc.). For example, the processor may determine the first carrier is to carry the transmission confirmation, e.g., responsive to the first carrier being a licensed carrier and the second carrier being a DSS carrier.

The message resource allocation signal may be sent via a Radio Resource Control (RRC) signal.

Control channel elements in the data space or resources of the first carrier intended for confirmation transmissions may be reserved, each of the reserved control channel elements may be linked (e.g., semi-statically linked) to a respective supplementary carrier. The uplink transmission confirmation may be transmitted via the first carrier using the control information space or resources allocated to the reserved control channel elements. The reserved control channel element may be linked to the supplementary carrier used for the uplink transmission (e.g., that is confirmed by the transmission confirmation).

In certain exemplary embodiments, the reserved control channel elements are maintained in the control information space or resources of the first carrier for confirmation transmissions regardless of uplink grants by the first wireless device.

In certain exemplary embodiments, the control channel elements in the control information space or resources of the first and second carriers may be reserved for uplink confirmation transmissions and the uplink transmission confirmation may be transmitted via one of the first or second carriers using the control information space or resources allocated to the reserved control channel elements.

The second carrier may be a frequency division duplexing (FDD) carrier in a DSS band and the FDD carrier may be dynamically switched between a first operating mode in which the FDD carrier is uplink and a second operating mode in which the FDD carrier is downlink. For example, in the first operating mode, the uplink transmission confirmation may be allocated to the message resource of one of the first or second carriers indicated by a message resource allocation message or signal, and in the second operating mode, the uplink transmission confirmation previously allocated by the message resource allocation message or signal may be unallocated. The first device may send to the second device a switching signal to switch the FDD carrier between the first and second modes.

The allocation of message resources may be modified when one or more carriers used to communicate between the first and second wireless devices is changed.

Resource blocks may be reserved in the data space or resources of the first carrier for confirmation transmissions and each of the reserved resource blocks may be linked to a respective supplementary carrier such that the uplink transmission confirmation may be transmitted via the first carrier using the data space or resources allocated to the reserved resource blocks (e.g., which may be linked to the supplementary carrier used for the uplink transmission).

The first device in a control area of each respective subframe may establish an identifier that indicates a location of the reserved resource blocks in a respective subframe and an adjustment of the location of the reserved resource block for one or more subsequent subframes may occur in accordance with a measured transmission quality (e.g., CQI).

Resource blocks in the data space or resources of the first and second carriers for uplink confirmation transmission may be reserved such that the uplink transmission confirmation may be transmitted via one of the first or second carriers using the data space or resources allocated to the reserved resource blocks (e.g., which may be identified by the M-RNTI).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method to provide feedback to a user equipment (UE), the method comprising:
    allocating resources for providing feedback to the UE on a licensed band;
    receiving uplink data from the UE via a supplementary cell that uses an unlicensed band;
    increasing the allocated resources in response to receiving the uplink data via the supplementary cell;
    determining a downlink channel on the licensed band for sending feedback associated with the uplink data based on whether downlink data is available for transmission to the UE, wherein the feedback is determined to be sent to the UE via a Physical Downlink Shared Channel (PDSCH) when the downlink data is available for transmission to the UE, and the feedback is determined to be sent to the UE via a Physical Downlink Control Channel (PDCCH) when the downlink data is not available for transmission to the UE; and
    sending the feedback via the determined channel, wherein when the feedback is sent via the PDSCH, the feedback is multiplexed with the downlink data, and wherein when the feedback is sent via the PDCCH, the feedback is sent via a DCI format on the PDCCH, a modulation and encoding value being associated with the DCI format that indicates that the DCI format comprises ACK/NACK information.

2. The method of claim 1, wherein the ACK/NACK information associated with the feedback is sent in a resource block assignment.

3. The method of claim 2, wherein the resource block assignment is a single resource block using a type 2 allocation.

4. The method of claim 1, wherein the DCI format is format 1C associated with the PDCCH.

5. The method of claim 1, wherein the feedback is sent on a primary component carrier.

6. The method of claim 1, wherein the feedback is sent on a licensed cell.

7. A network device configured to provide feedback to a user equipment (UE), the network device comprising:
    a processor configured to:
        allocate resources for providing feedback to the UE on a licensed band;
        receive uplink data from the UE via a supplementary cell that uses an unlicensed band;
        increase the allocated resources in response to receiving the uplink data via the supplementary cell;
        determine a downlink channel on the licensed band for sending feedback associated with the uplink data based on whether downlink data is available for transmission to the UE, wherein the feedback is determined to be sent to the UE via a Physical Downlink Shared Channel (PDSCH) when the downlink data is available for transmission to the UE, and the feedback is determined to be sent to the UE via a Physical Downlink Control Channel (PDCCH) when the downlink data is not available for transmission to the UE; and send the feedback via the determined channel, wherein when the feedback is sent via the PDSCH, the feedback is multiplexed with the downlink data, and wherein when the feedback is sent via the PDCCH, the feedback is sent via a DCI format on the PDCCH, a modulation and encoding value being associated with the DCI format that indicates that the DCI format comprises ACK/NACK information.

8. The network device of claim 7, wherein the ACK/NACK information associated with the feedback is sent in a resource block assignment.

9. The network device of claim 8, wherein the resource block assignment is a single resource block using a type 2 allocation.

10. The network device of claim 7, wherein the DCI format is format 1C associated with the PDCCH.

11. The network device of claim 7, wherein the feedback is sent on a primary component carrier.

12. The network device of claim 7, wherein the feedback is sent on a licensed cell.

* * * * *